United States Patent
Allen et al.

(10) Patent No.: US 10,227,720 B2
(45) Date of Patent: Mar. 12, 2019

(54) OZONE PROCESS FOR COLOR REMOVAL

(71) Applicant: GUARDIAN MANUFACTURING, INC., Cocoa, FL (US)

(72) Inventors: Thomas R. Allen, Fairview Park, OH (US); Charles Smith, Merritt Island, FL (US); Thoram Charanda, Mount Dora, FL (US)

(73) Assignee: GUARDIAN MANUFACTURING, INC., Cocoa, FL (US)

( * ) Notice: Subject to any disclaimer, the term of this patent is extended or adjusted under 35 U.S.C. 154(b) by 0 days.

(21) Appl. No.: 15/281,686

(22) Filed: Sep. 30, 2016

(65) Prior Publication Data

US 2017/0016175 A1 Jan. 19, 2017

Related U.S. Application Data

(63) Continuation-in-part of application No. 14/694,120, filed on Apr. 23, 2015, now Pat. No. 9,493,896.

(60) Provisional application No. 62/241,301, filed on Oct. 14, 2015, provisional application No. 61/983,661, filed on Apr. 24, 2014.

(51) Int. Cl.
  *C02F 1/78* (2006.01)
  *D06B 23/14* (2006.01)
  (Continued)

(52) U.S. Cl.
  CPC .............. *D06B 23/14* (2013.01); *C02F 1/008* (2013.01); *C02F 1/78* (2013.01); *D06B 11/0096* (2013.01);
  (Continued)

(58) Field of Classification Search
  None
  See application file for complete search history.

(56) References Cited

U.S. PATENT DOCUMENTS 5,313,811 A * 5/1994 Wasinger .............. D06F 35/001
  68/13 R
7,141,075 B1 11/2006 Stackhouse et al.
  (Continued)

FOREIGN PATENT DOCUMENTS

CN   1542201       11/2004
EP   1518955 A1    3/2005
  (Continued)

OTHER PUBLICATIONS

International Patent Application No. PCT/US2016/054680, International Preliminary Report on Patentability dated May 23, 2017, 13 pages.
(Continued)

*Primary Examiner* — Michael E Barr
*Assistant Examiner* — Cristi J Tate-Sims
(74) *Attorney, Agent, or Firm* — Kilpatrick Townsend & Stockton LLP; Kristin M. Crall

(57) ABSTRACT

Embodiments relate generally to methods and systems for bleaching textiles using ozone gas that incorporates a color removal step. In one example, there is provided a hybrid machine that incorporates certain features of a washer, but that also includes an integrated blower for gas distribution inside the machine. There is also provided an ozone dosing control system that allows for maintenance of a constant concentration of ozone in the machine. In one embodiment, the ozone output measured in grams/hour at this constant concentration in conjunction with the weight of product measured being treated may be referred to as the "bleaching factor." There is further provided a wastewater dye removal step, in which ozone is used to clean the water and remove dyes and other colors that may be deposited via denim or other garments.

11 Claims, 25 Drawing Sheets

(51) Int. Cl.
*C02F 1/00* (2006.01)
*D06P 5/13* (2006.01)
*D06M 11/34* (2006.01)
*D06B 11/00* (2006.01)
*D06L 4/13* (2017.01)
*D06L 4/00* (2017.01)
*D06L 4/50* (2017.01)
*D06B 23/20* (2006.01)
*C02F 101/30* (2006.01)
*C02F 103/30* (2006.01)
*D06F 35/00* (2006.01)

(52) U.S. Cl.
CPC ............... *D06B 23/20* (2013.01); *D06L 4/00* (2017.01); *D06L 4/13* (2017.01); *D06L 4/50* (2017.01); *D06M 11/34* (2013.01); *D06P 5/132* (2013.01); *C02F 2101/308* (2013.01); *C02F 2103/30* (2013.01); *C02F 2209/44* (2013.01); *D06F 35/001* (2013.01)

(56) References Cited

U.S. PATENT DOCUMENTS

2005/0115004 A1* 6/2005 Tashiro .............. D06B 11/0096
    8/102
2011/0083282 A1    4/2011 Myung et al.
2011/0110817 A1*  5/2011 Lupo ..................... C02F 1/00
    422/21
2012/0276821 A1   11/2012 Richardiere et al.
2014/0068871 A1    3/2014 Youn
2015/0308030 A1* 10/2015 Allen ...................... D06B 5/00
    8/111

FOREIGN PATENT DOCUMENTS

| EP | 2562136 A1 | 2/2013 |
| RU | 2257434 C1 | 7/2005 |
| WO | 9513415 A1 | 5/1995 |
| WO | 0134894 A1 | 5/2001 |
| WO | 2015164577 A1 | 10/2015 |

OTHER PUBLICATIONS

International Patent Application No. PCT/US2015/027246, International Search Report and Written Opinion dated Jul. 24, 2015, 12 pages.
International Patent Application No. PCT/US2015/027246, International Preliminary Report on Patentability dated Dec. 21, 2015, 15 pages.
U.S. Appl. No. 14/694,120, Notice of Allowance dated Jul. 12, 2016, 8 pages
International Patent Application No. PCT/US2016/054680, International Search Report and Written Opinion dated Jan. 3, 2017, 16 pages.

* cited by examiner

OZONE PROCESS FOR COLOR REMOVAL

CROSS REFERENCE TO RELATED APPLICATIONS

This application claims the benefit of U.S. Provisional Application Ser. No. 62/241,301, Oct. 14, 2015, titled "Ozone Process for Color Removal." This application is also a continuation-in-part of U.S. Ser. No. 14/694,120, filed Apr. 23, 2015, titled "Method of Bleaching Textiles and Clothing Items with Ozone," now allowed, which application claims benefit to U.S. Provisional Application Ser. No. 61/983,661 filed Apr. 24, 2014, the entire contents of each of which are hereby incorporated by reference.

FIELD OF THE DISCLOSURE

Embodiments of the present disclosure relate generally to methods and systems for bleaching textiles using ozone gas that incorporates a color removal step. In one example, there is provided a hybrid machine that incorporates certain features of a washer, but that also includes an integrated blower for gas distribution inside the machine. There is also provided an ozone dosing control system that allows for maintenance of a constant concentration of ozone in the machine. In one embodiment, the ozone output measured in grams/hour at this constant concentration in conjunction with the weight of product measured being treated may be referred to as the "bleaching factor." There is further provided an in-process water dye removal step and a wastewater dye removal step, in which ozone is used to clean the water and remove dyes and other colors that may be deposited via denim or other garments, for further use in a continuing step or to remove color prior to draining and discharge to a downstream water treatment system (such as a reuse system or city sewer).

BACKGROUND

Ozone gas has been used to bleach denim, with mixed results. For example, some early attempts used ozone gas produced with various types and brands of ozone generators, and simply injected the ozone into commercial washers. The washers were standard commercial machines that the users would modify by sealing up vents and ports in order to get them to "hold" the ozone inside for the process. These processes relied primarily on the ozone system's stated output levels and delivered mixed results. They were generally used only for removal of excess indigo dye from denim after processing.

Later machines used lower cost commercial "dryer type" machines, in place of washers, in efforts to offer a solution that was more sophisticated than simply connecting an ozone generator to an existing machine. These machines used a small blower to pull ozonated air out of the internal volume of the machines. However, these were dry machines only, not capable of handling any water injected into the system. They also failed to provide any flow rate or circulation of ozone inside the machine during processing.

Some of these machines had ozone analyzers installed on or inside the machines to measure the amount of ozone concentration in the internal machine volume. However, these systems provide only a user-programmed power percentage variability on the ozone generator to vary ozone levels. This results in low reproducibility of bleaching effects, as well as variability based on operator knowledge. It is thus desirable to provide improved ozone bleaching systems.

In traditional denim wash processes, there may be problems with re-depositing (also referred to as back-staining) of indigo dye onto white pocket materials or other materials to be treated resulting in production shipping delays, seconds, or rejects. There have been chemicals used for preventing this pocket staining, for example chemical oxidizers. However, the normal wash and bleach processes require clear water rinses to be used between process steps. This can be time-consuming and is not an environmentally-friendly solution. Accordingly, improvements are needed.

BRIEF SUMMARY

Embodiments of the invention described herein thus provide systems and methods for bleaching textiles that are more reliable and reproducible. This disclosure provides for process control that allows a particular dosage rate or concentration of ozone to be held throughout the process. This disclosure also provides a hybrid washing machine that includes an integrated blowing system for circulating ozonated air inside the machine during the bleaching process. The hybrid washing machine may incorporate features of a sealed vessel, a washing machine, and the air circulation volume typically associated with commercial dryers. Embodiments also provide methods for removing indigo dyes, reactive dyes, vat dyes, acid dyes, pigment dyes, or any other dyes in the process water contained within the machine in use.

DETAILED DESCRIPTION

In one aspect, embodiments of the present invention provide methods and systems for bleaching textiles with ozone using a hybrid washing machine that is specifically designed to be ozone compatible. In other aspects, embodiments provide an ozone system having specific dosing capability, such that a precise and reproducible bleaching factor may be programmed. In other aspects, embodiments provide a wet ozone bleaching process. The wet ozone bleaching process provides for recirculation of ozonated water contained in the machine. In further aspects, there is provided a dry ozone bleaching process. The dry ozone bleaching process provides for circulation and continued introduction of ozone in the air contained in the machine. These wet/dry processes may be provided by a hybrid washing machine that includes an integrated blower formed in combination therewith. The blower may be used to force ozonated air through the system in a generally uniform manner and to control recirculation. In other aspects, there is provided a wastewater dye/color removal process.

Figure 1A:
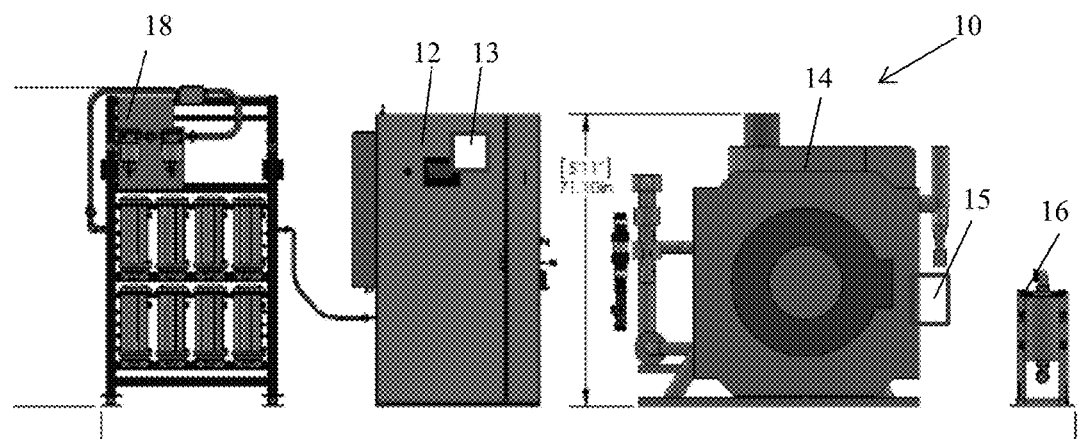
FIG. 1A shows a front perspective view of one embodiment of an ozone bleaching system described herein.
Figure 1B:
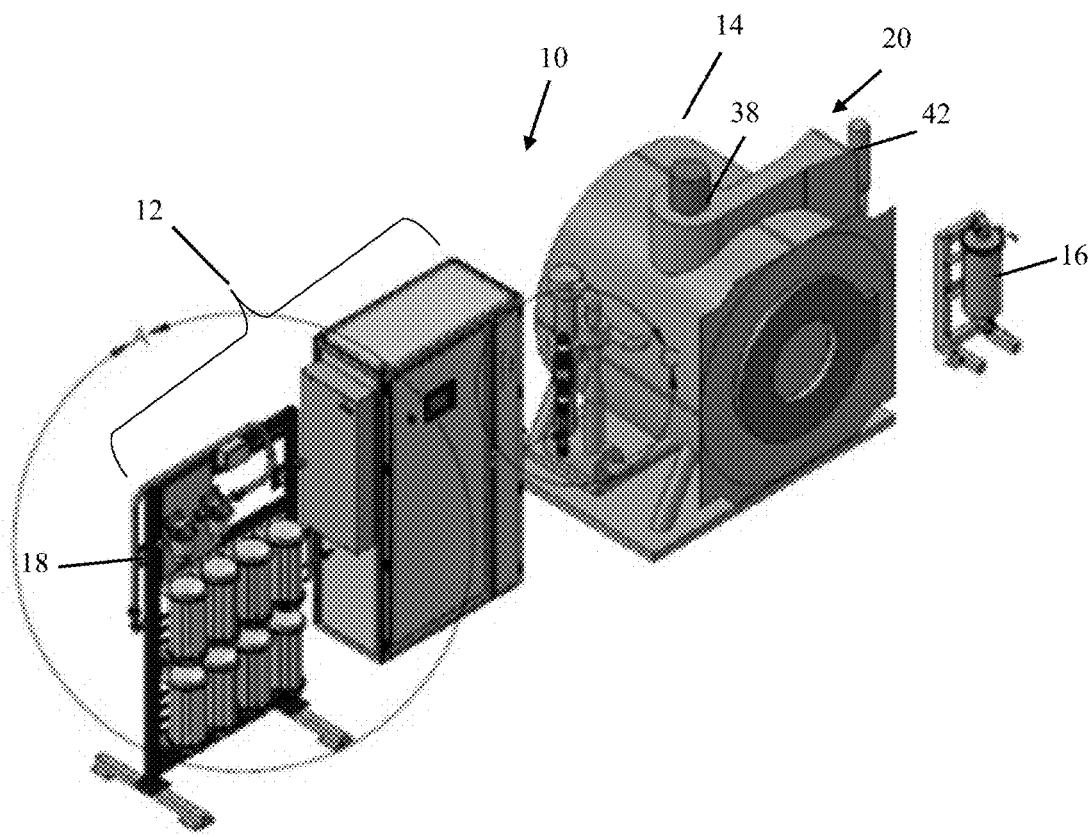
FIG. 1B shows a front plan view of the ozone bleaching system of FIG. 1A.

FIGS. 1A and 1B illustrate one example of various views of one embodiment of an ozone bleaching system 10. This system embodiment is provided with an ozone generator 12, a textile ozone treatment component 14, and an ozone destruct unit 16. The ozone generator 12 is shown having an oxygen supply rack 18, but it should be understood that the ozone generator may have an oxygen generator integrally formed therewith. For example, the oxygen generator (and/or oxygen supply rack) and the ozone generator may be contained in the same housing. The ozone generator 12 may also be provided with a high concentration ozone analyzer 13. High concentration ozone analyzers are generally used for measuring the output of the ozone generator 12, in real time while in operation.

The ozone generator 12 may be fluidly connected with the textile ozone treatment component 14. In use, the textile ozone treatment component 14 is the portion of the system that is loaded with the textiles to be treated. In one specific embodiment, the treatment component 14 may be designed as a hybrid washing machine, as described further below.

In one embodiment, the ozone generator is configured such that, when the ozone generator starts up, it generally makes a predetermined fixed amount of ozone, as soon as it receives an ozone request from of the connected washers. It will then continue to make that amount of ozone for a programed (and variable) amount of time after all ozone demand (from any connected washer) has ended. If excess ozone is generated that is not actually needed in a washer, is it simply directed to the ozone destruct unit. This allows for a complete cycle to be run in any washer, with only one potential wait time, for the ozone system to stabilize and reach proper concentration and output.

An ozone destruct unit 16 is fluidly connected with an outlet of the textile ozone treatment component 14. The ozone destruct unit 16 is a safety measure used when dealing with high concentrations of ozone. Because ozone is toxic and can be harmful, before ozonated air can leave the treatment component 14, the high concentrations of ozone must be removed. The ozone destruct unit 16 provides a catalytic destruct process that will safely destroy (and convert back to oxygen) any excess ozone that is present in the air that is to be off gassed from the treatment component 14. An optional demister 15 may also be included. The demister 15 can help remove any excess moisture from the air to be off gassed before it enters the ozone destruct unit 16.

The ozone bleaching system 10 described herein may also have a user interface screen. This user interface screen may communicate with a computer or processor or other electronic component for controlling weight percent (% wt) of ozone delivered. The system may also be designed to control flow rate, temperature, or any other variable that may be determined as useful to the bleaching processes described herein.

Dry Bleaching Features.

As shown in FIGS. 1-5 and 17, the textile ozone treatment component 14 may be provided with an integrated blower component 20. The blower component 20 circulates air flow volume within the treatment component 14. This may be particularly useful for a dry bleaching process. The blower component 20 forces ozonated air (and in some instances, fresh air) through the treatment component 14. In one specific design, the blower component 20 may turn over the volume of air in the treatment component 14 as quickly as about once every second. The blower component 20 may include a centrifugal fan 38 and a fan exhaust 42.

In one embodiment, the blower component 20 may be a high flow blower that is built into the washer or textile ozone treatment component 14 to allow quick turnover of the air volume in the machine. Forced airflow is believed to provide good contact of the ozone with the textiles/fabrics to be bleached. It is also believed to ensure that proper bleaching occurs in a uniform manner, throughout the load of garments. (At the end of the process, the blower component 20 may also be used to create a force of air to purge the machine during the destruct step. This can eliminate the need for use of a separate external fan for this process.)

Figure 2:
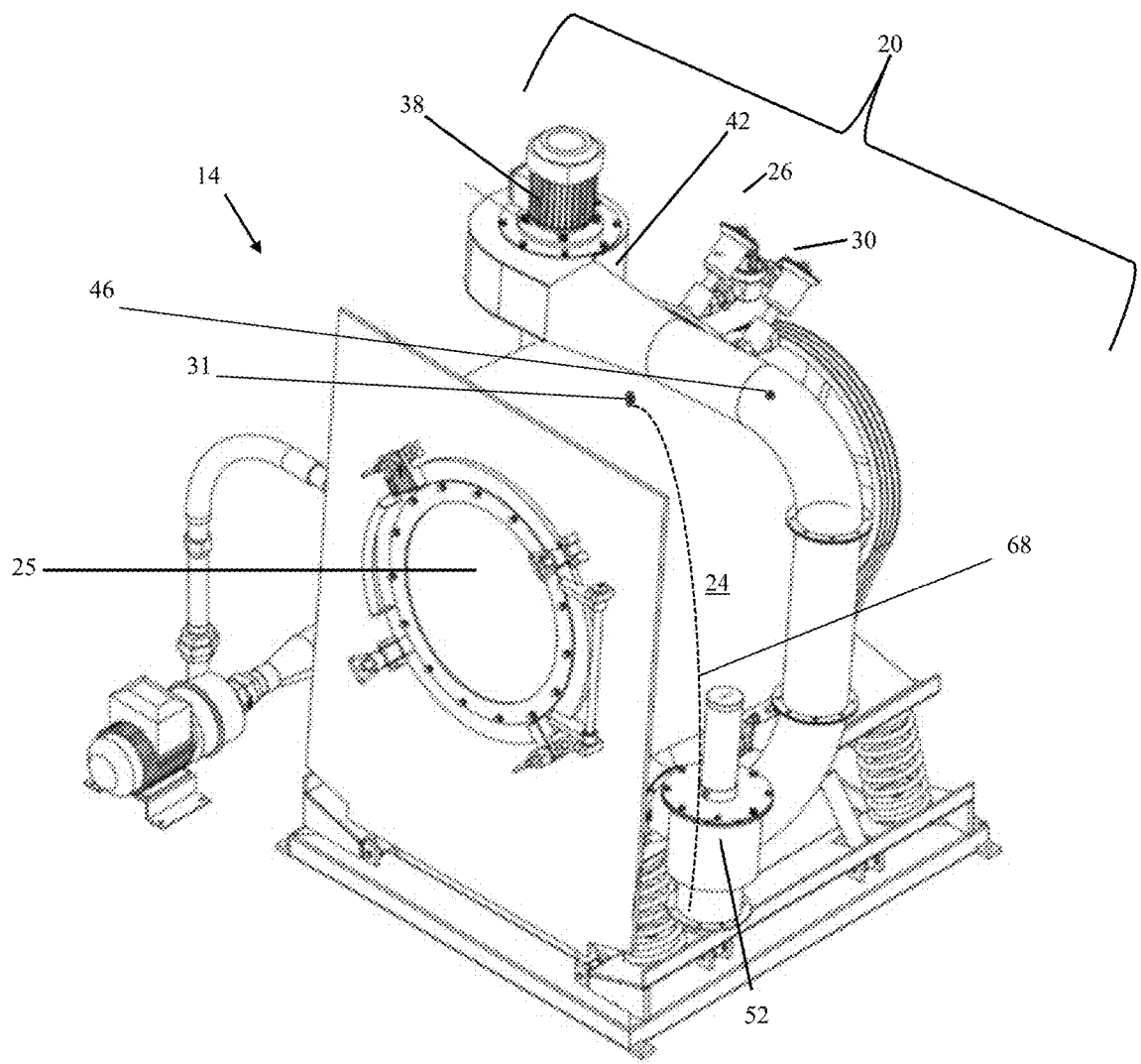
FIG. 2 shows a front perspective view of one embodiment of a hybrid washing machine for ozone treatment.
Figure 3:
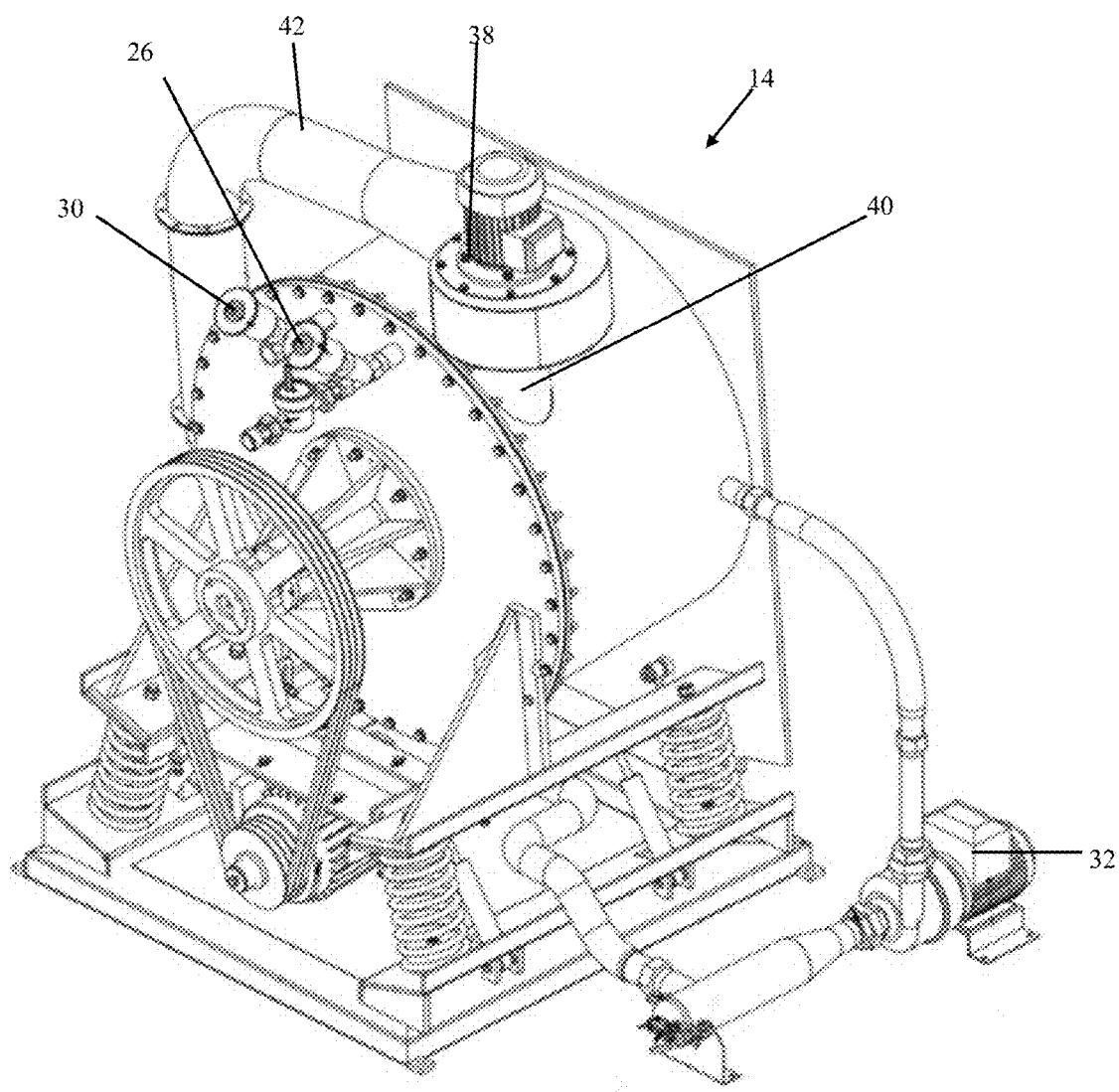
FIG. 3 shows a rear perspective view of the hybrid washing machine of FIG. 2.

In embodiments in which the textile ozone treatment component 14 is designed as a hybrid washing machine, the treatment component 14 may also incorporate features of a washer for performing pre-rinsing and for uniform wetting of the fabric prior to ozonation. It may also incorporate features that allow circulation of ozonated water for bleaching treatment. This may be particularly useful for a wet bleaching process. One example of such a hybrid washing machine 14 is illustrated by FIGS. 2 and 3. This hybrid washing machine 14 has features of both a washing unit and a drying unit incorporated into the same machine 14. In these figures, the machine 14 is shown as having a barrel 24 (or cylinder) for holding textiles to be treated and to provide an enclosed space in which the treatment takes place. The barrel 24 may have a door 25 that is openable and closeable to maintain a closed system. In certain embodiments, the door 25 may contain door security provided by a pneumatic cylinder.

The machine 14 is also shown as having a fluid/water inlet 26 (and accompanying valve) and a fresh air inlet/valve 30. The machine 14 may also have a pressure equalization port 31. The pressure equalization port 31 may be connected to a dedicated ozone gas release tube 68. This release tube 68 may be directly connected to plumbing of the ozone destruct unit 16 in order to allow for ozone gas to escape during the ozonation process and to prevent over-pressurization of the machine. Over pressurizing of the machine could cause ozone leaks and stop gas flow from maintaining proper ozone levels in the vessel, so this port 31 allows ozone to escape the barrel 24 and to be delivered to the ozone destruct unit 16. In one embodiment, the port 31 may be provided as an open pipe on the highest part of the machine (so that water does not reach it) that directs ozone toward the ozone destruct unit. The port 31 is intended to avoid any pressurization in the machine while injecting ozone.

Water or other solvent may be delivered to the barrel 24 through the fluid/water inlet 26. For example, water may be injected to wet or dampen the textiles prior to the dry bleaching treatment. The ozone destruct valve 50 is opened when fluid is being injected into the barrel 24 to help equalize pressure inside the barrel 24. Once the barrel 24 has been filled with ozonated air, the blower component 20 causes the air to have a high flow rate with generally good air circulation. This can help provide uniform distribution of ozone within the barrel 24, leading to a uniform bleaching treatment of the textiles contained therein.

In one example, in order to maintain air circulation/air flow, the barrel 24 may be maintained at a slightly positive pressure in use. In another example, the barrel may be maintained at essentially ambient pressure due to the open decompression valve/port 31 which has a tube 68 connected to the destruct unit 16. It has been found that this may be conducive to creating a generally uniform ozone atmosphere. As the ozone generator 12 injects ozonated air into the machine at the ozone inlet 46, the blower component 20 forces movement of the air. As the barrel 24 becomes filled with ozonated air, the decompression valve/pressure equalization port 31 may maintain a near ambient pressure level within the barrel 24. In other examples, the pressure may be slightly positive. This allows continued flow and recirculation through the barrel 24. As a portion of used ozonated air escapes through the pressure equalization port 31 during the ozone gas injection process and is delivered to the ozone destruct unit 16, ozonated air can be continually injected into the barrel through ozone inlet 46. Thus, the pressure equalization port 31 assists with depressurization of the barrel 24. Additionally, most ozonated air is re-circulated away from and back into the barrel 24 through the blower component 20 at a recirculation inlet 40.

Figure 4:
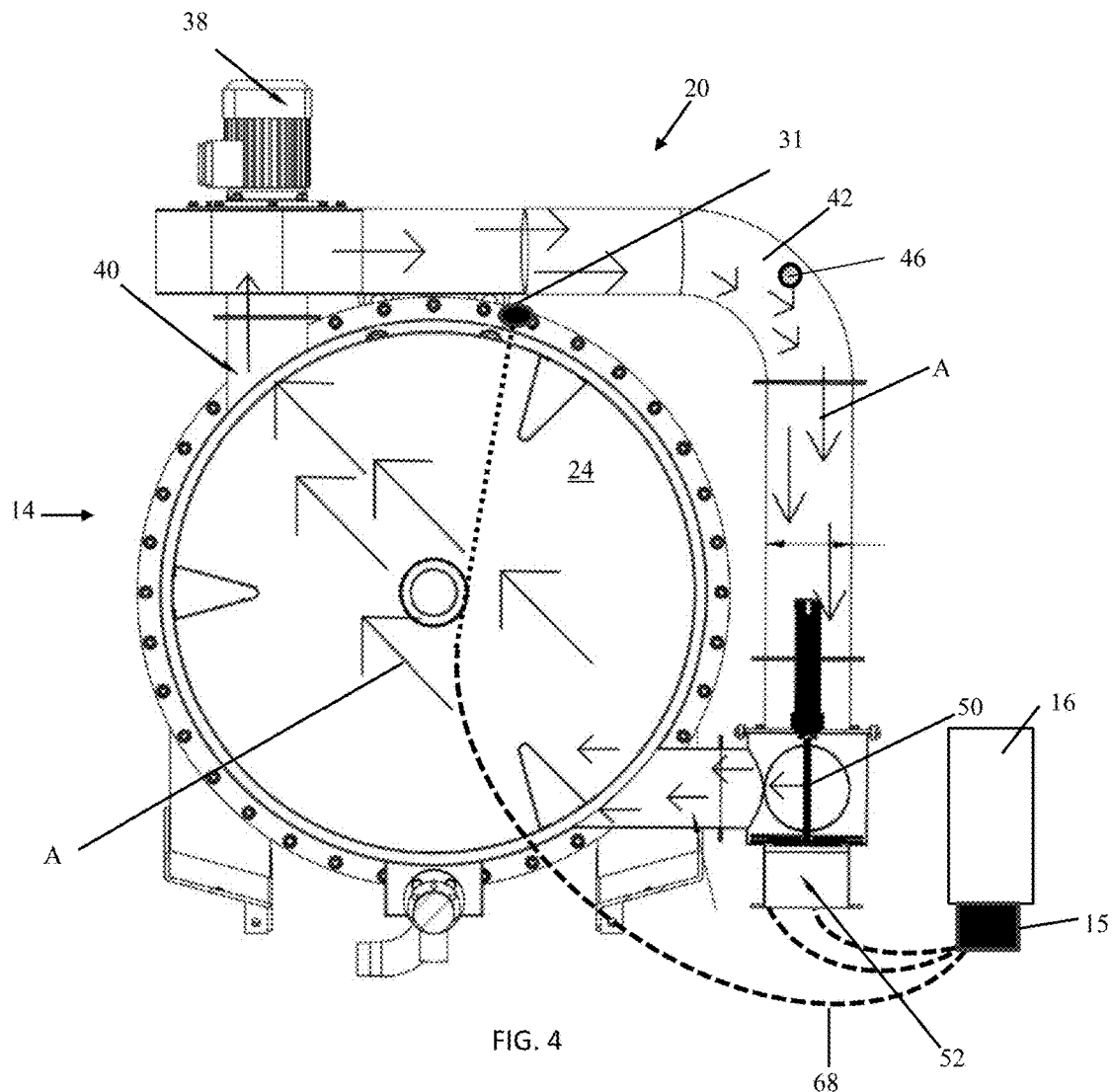
FIG. 4 shows a front view schematic illustrating air flow circulation through a hybrid washing machine for ozone treatment.
Figure 5:
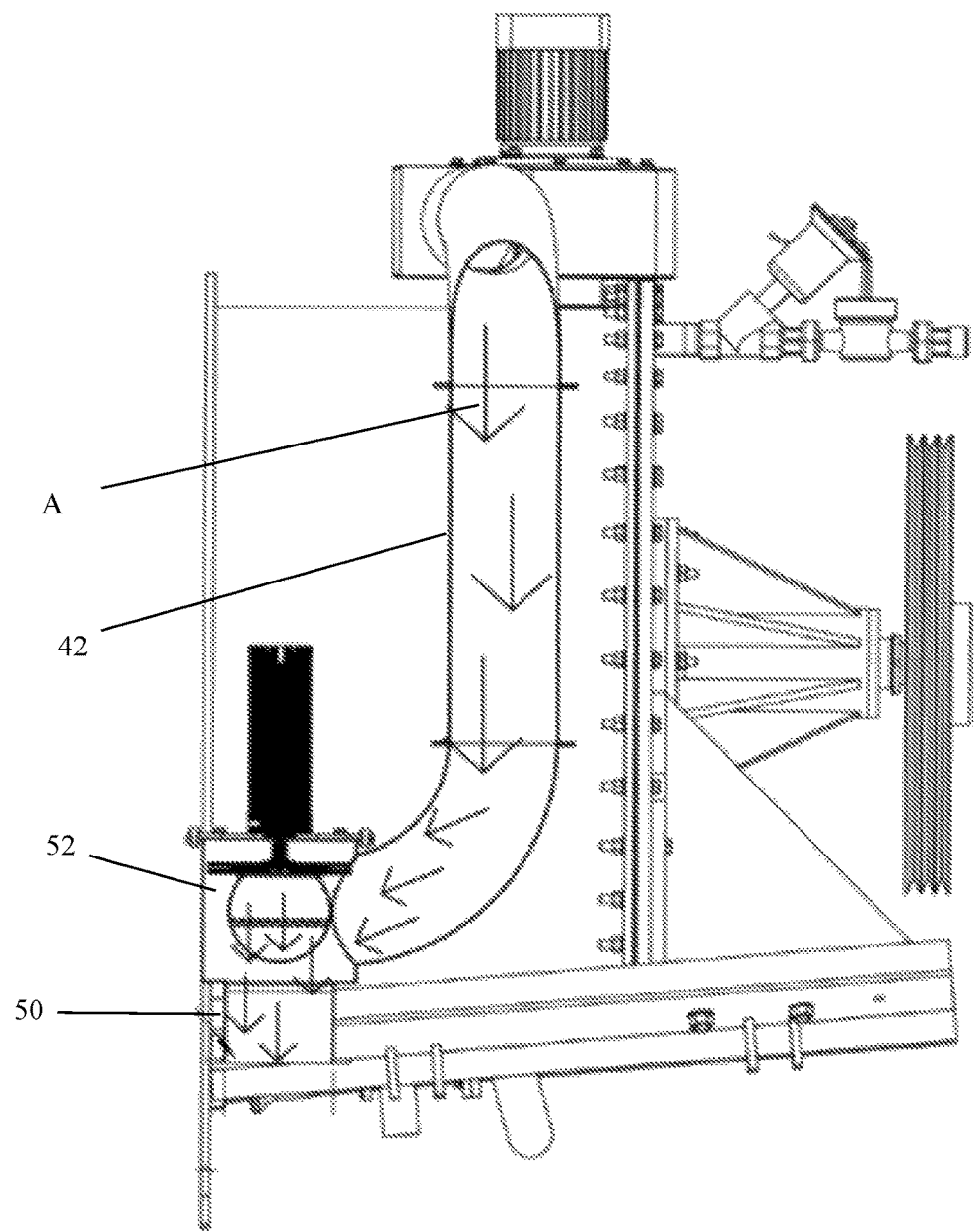
FIG. 5 shows a side schematic view of the airflow circulation of FIG. 4.

FIGS. 4 and 5 illustrate schematics of air recirculation through the hybrid washing machine 14. Air flow is generally shown with arrows "A." In these figures, the machine 14 is shown with a fan portion 38 of the blower component 20. There is also provided a fan exhaust 42, which serves as an air conduit for directing air from the fan portion 38 to the barrel.

An ozone destruct valve 50 may be provided in order to control the flow of air back into the barrel or out of the barrel. When the ozone destruct valve 50 is closed, ozonated air is recirculated back into the barrel 24. When the ozone destruct valve 50 is opened at the end of the process, all of the ozonated air in the barrel 24 will be forced out of the ozone outlet 52 and into the ozone destruct unit 16. The ozone destruct valve/outlet configuration may be considered a high volume flow valve/outlet because it is used for quickly moving ozonated air out of the barrel 24 and into the ozone destruct unit 16. The ozone destruct valve 50/outlet 52 work in conjunction with the high volume blower component 20 and the fresh air valve 30 in order to force ozonated air out of the barrel 24 and replace it with fresh air during the destruct step. The fresh air valve 30 is opened during the ozone destruction step so that fresh air can be pulled in while destructing the ozonized air.

Figure 6:
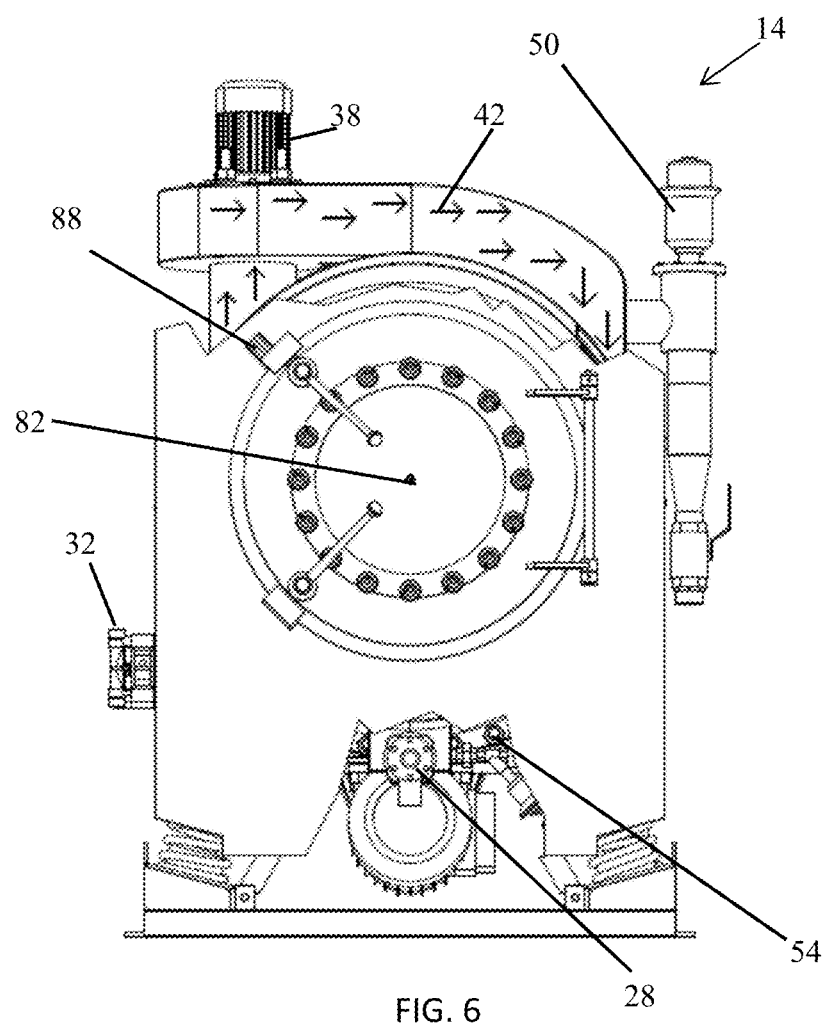
FIG. 6 shows a front plan view of airflow through an alternate embodiment of a hybrid washing machine for ozone treatment.
Figure 7:
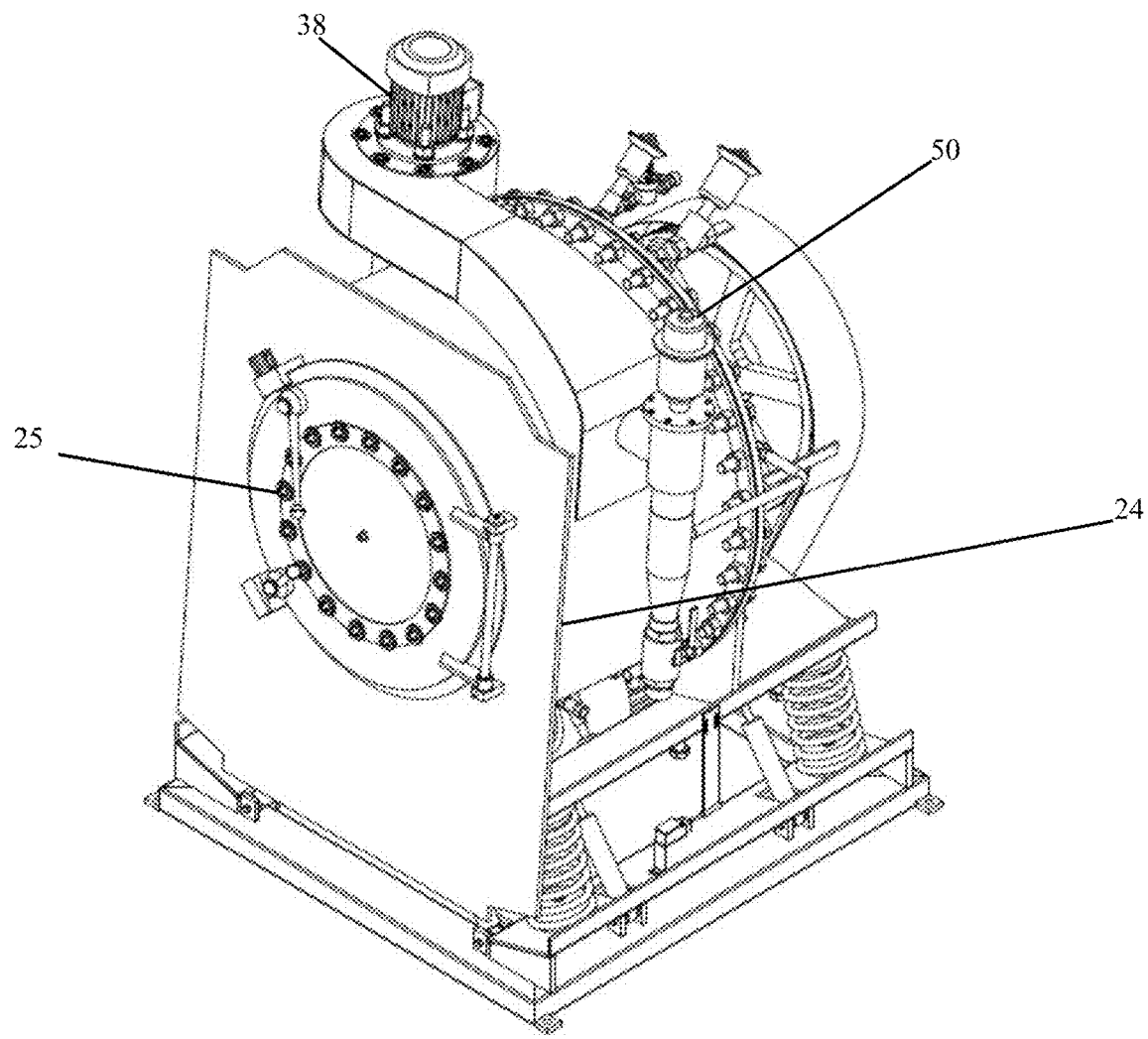
FIG. 7 shows a front perspective view of the machine of FIG. 6.
Figure 8:
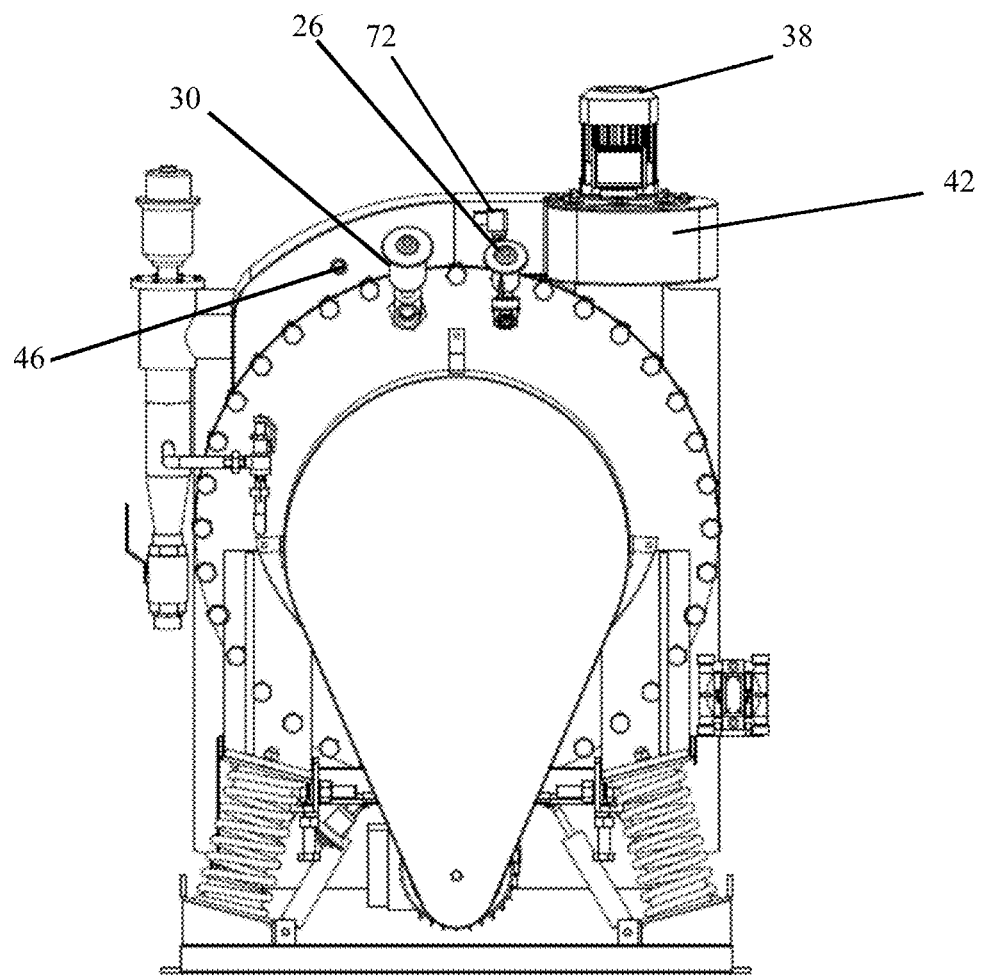
FIG. 8 shows a rear plan view of the machine of FIG. 6.

FIGS. 6-8 show alternate embodiments of a hybrid washing machine. In these embodiments, the ozone destruct valve 50 may be located closer to the fan 38, allowing the fan exhaust 42 to be shortened. FIG. 6 further illustrates one embodiment of a door security feature, which may be provided as a door security cylinder 88.

It is also possible for the hybrid washing machine embodiment to provide for steam and/or humidity to be added during the dry ozone bleaching treatment processes. The use of steam may help make the ozone destruction process proceed more quickly. FIG. 6 illustrates a humidity injector nozzle 82 and a steam inlet/valve 54. It should be understood that these features may be located at any appropriate location on machine 14. These features allow humidity and/or steam to be injected into the barrel 24 at any time desired during the process. The ability to add humidity may be related to holding a constant moisture level in the fabric throughout the bleaching process. Without humidity or steam, the level of moisture in the barrel may potentially decrease from both the air circulation and the addition of dry ozone gas.

In use, once textiles or garments are loaded into the barrel 24, water or another liquid solvent may be added through the water inlet 26 in order to wet the materials. This may be done as a pre-rinse procedure, with one or more cycles to wet and extract fluid from the textiles. For example, there may be a spin cycle that will allow for various options of moisture retention and/or moisture removal. In other embodiments, it is possible to move directly into an ozonation process, particularly if it is desirable to conduct the bleaching process on soaking wet textiles. (It should also be understood that any water or fluid delivery steps may be eliminated if the process to be conducted on dry textiles.)

The pressure equalization port 31 remains open any time that ozone is being injected into the machine 14. This is the only place that air can escape the machine, so it provides a depressurization function. Generally, whether in gas injection or just water fill, the port 31 remains open in order to allow air to escape the machine to avoid pressurization. Ozone may then be added into the ozone inlet 46 while the blower component 20 forces its circulation into the barrel 24. In one example, this may be accomplished by injecting ozone from the ozone generator 12 into the ozone/oxygen inlet 46 on the treatment component 14.

The ozone generator 12 may include one or more pressure gauges in order to confirm that the ozone to be delivered is at an adequate pressure. The ozone/oxygen inlet 46 may be directly connected to the ozone generator 12. In one embodiment, the ozone/oxygen inlet 46 may be positioned on the fan exhaust 42. In another embodiment, the ozone/oxygen inlet 46 may have a hose connected therewith. This may allow the ozone generator 12 and the treatment component 14 to be positioned a distance from one another, if desired.

FIG. 8 shows one potential location for ozone inlet 46. Ozone inlet 46 is generally fluidly connected to an ozone generator 12 (not shown in these figures). In this example, the ozone inlet is positioned on the fan exhaust 42 such that injected ozone will be blown directly into the barrel 24. Ozone injected into the ozone inlet 46 is delivered to the barrel 24 due to the force of air from the blower component fan. In the example shown, as illustrated by the arrows "A" in FIG. 4, the blower component 20 pushes air from the fan 38, through the fan exhaust 42, picks up ozonated air injected through the ozone inlet 46, and directs the ozonated air into the barrel 24, causing circulation of the ozonated air. This ozone recirculation is one of the features that allows the system described herein to be more effective and repeatable than prior systems. It should be understood, however, that this feature, as well as the other features described herein, may be positioned elsewhere on the system.

The blower component 20 causes circulation and re-circulation of ozone through the system. It can also help with off-gassing or de-gassing processes. For example, when the fan 38 is activated and the ozone destruct valve 50 is open, it is possible to quickly purge ozone from the interior of the machine 14. For example, as ozone is injected into the treatment component 14 and as the blower component 20 circulates ozone, the ozone destruct valve 50 remains closed so that the ozone remains in recirculation. When the ozone destruct valve 50 is opened, the ozonated air in the system is forced out through the ozone destruct outlet 52, to the ozone destruct unit 16. The exhausting of air from the barrel 24, through the ozone destruct valve 50, will start to create a vacuum on the barrel 24 void. The fresh air valve 30 is opened shortly after the ozone destruct valve 50 to allow fresh air into the barrel 22, satisfying the vacuum being created by ozonated air being forced out of the barrel 24 by the blower component 20, through ozone destruct valve 50 to ozone destruct 16. The fresh air valve 30 is only opened as part of the ozone destruct process. It allows fresh air to be pulled into the system and helps push the ozonated air out through the ozone destruct outlet 52. When the ozone destruct cycle has been completed, the drain 28 may also be opened in order to allow any remaining liquid or moisture to drain from the barrel 24.

FIG. 8 also illustrates an ozone safety sensor 72. This may be an ambient ozone sensor provided in order to detect whether there is a proper/safe ozone level in washer, prior to unlocking the machine door 25. This sensor 72 may be activated after the bleaching process has been completed and the ozone has been evacuated from the barrel 24.

Wet Bleaching Features.

Figure 9:
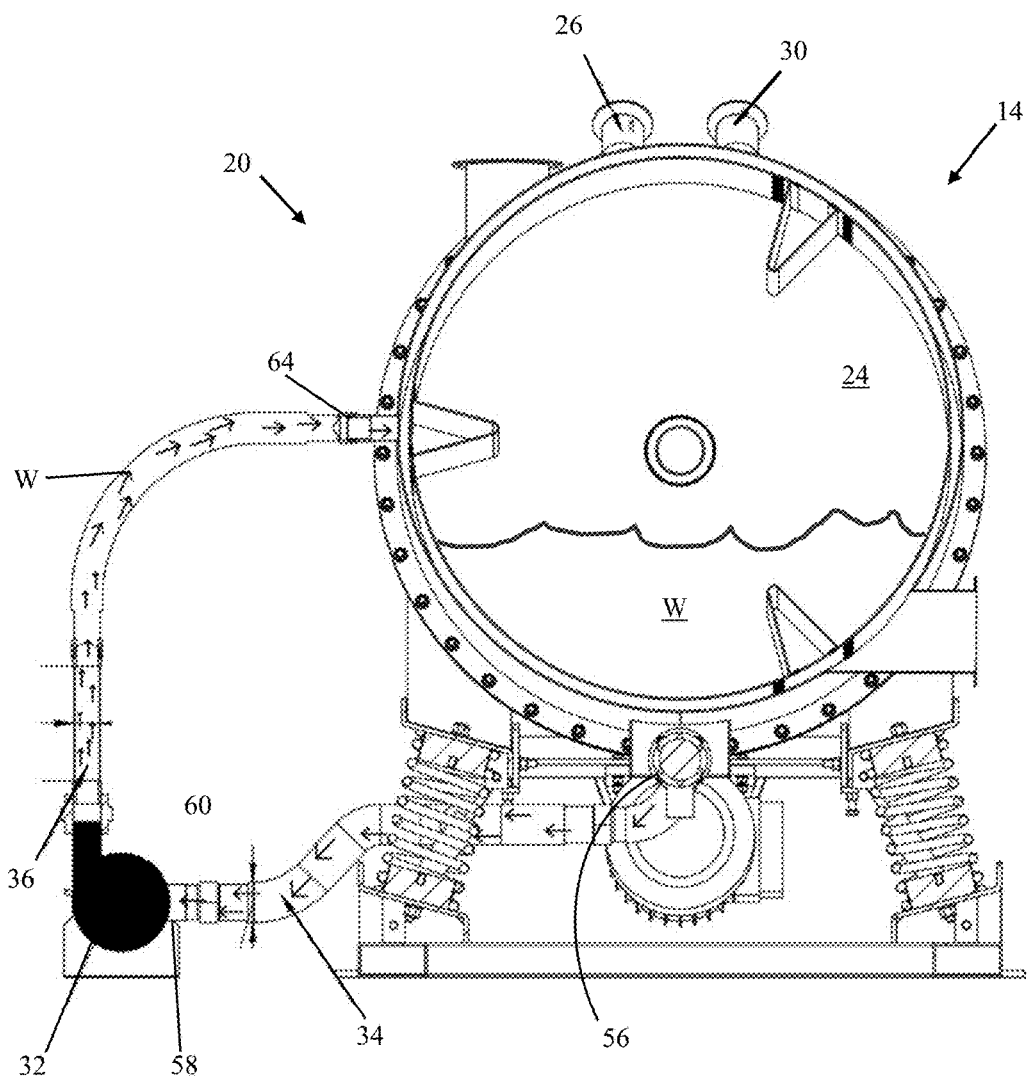
FIG. 9 shows a front view schematic illustrating water flow circulation through a hybrid washing machine for ozone treatment.
Figure 10:
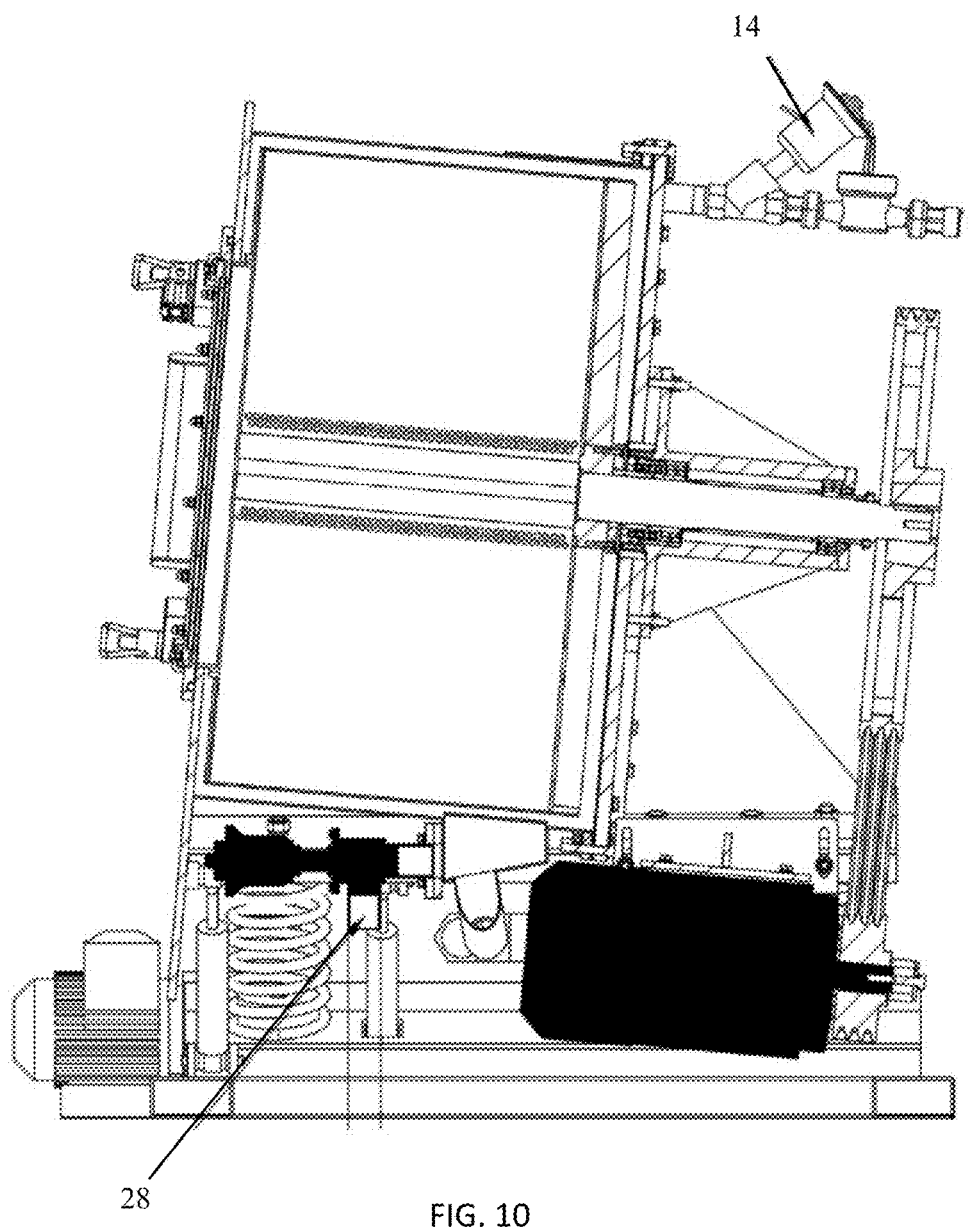
FIG. 10 shows a side plan view of the machine of FIG. 9.
Figure 18:
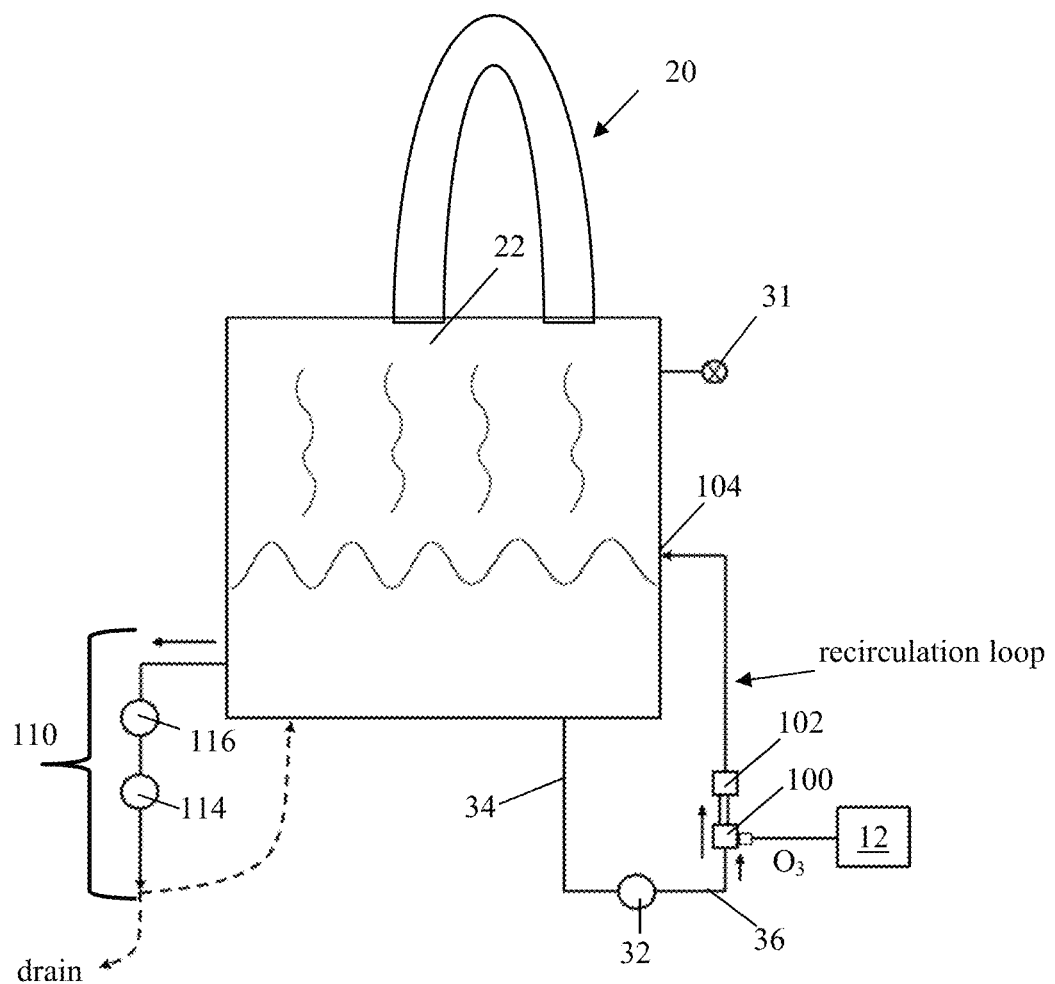
FIG. 18 shows a schematic of a wet process treatment.

FIGS. 9 and 18 generally show schematics illustrating water circulation through the machine 14. Water re-circulation may be useful for conducting wet bleaching processes. Water is shown with arrows "W." For a wet process, ozonated water may be injected into the barrel 24 through a venturi injector 100, shown in FIGS. 11 and 12. The venturi injector 100 combines ozone from an ozone generator 12 with water in order to provide ozonated water for a bleaching treatment. The venturi injector 100 may also be associated with a dynamic gas reactor 102 which can help agitate/mix ozone and water together. The dynamic gas reactor 102 may also be referred to as a static mixer. It is generally provided in order to dissolve the ozone gas into the water, increasing the transfer efficiency of the ozone into the water.

In one example, tap water may be introduced to the barrel 24 via valve 26 in a certain volume, based on the dry weight of the textiles to be treated. Ozone is then dosed into the water, via the water recirculation loop, to reach a programmed dissolved ozone level, tailored for a particular bleaching process that is to be conducted. For example, ozone may be delivered to the water (via an injector 100) being recirculated and then now ozonated water may be re-injected into the barrel 24 through ozonated water inlet 104. Ozonated water may be introduced into the barrel 24 at a certain volume depending on the dry weight of the textiles to be treated. This weight is generally measured in kilograms, but it should be understood that other weight units may be used. The dry weight of garments may be correlated or related to the volume of water per garment; in this example, the formula for ozone dosage may be related to the total liters of water inside the machine. (It should also be understood that water may be injected into the barrel 24 through the water inlet 26 prior to a dry bleaching process, in order for the textiles to be wet and rinsed. However, for a dry process, extraneous water may be extracted prior to ozonation. The machine will generally be provided with extraction controls that can control and vary the amount of water or moisture that is allowed to remain in the machine. It also may be desirable to be able to vary the amount of water and moisture in order to obtain various bleaching effects.) For a wet bleaching process, however, ozonated water remains in the barrel 24 throughout the bleaching process.

Figure 11:
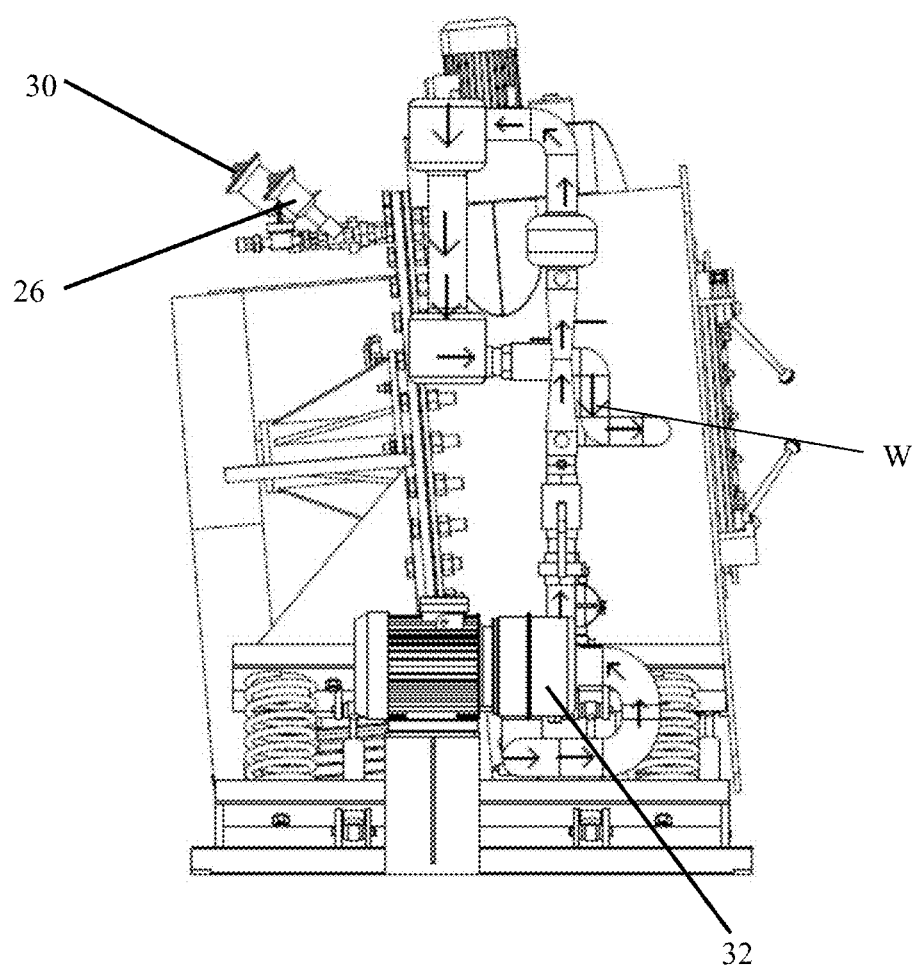
FIG. 11 shows a side plan view of water flow through an alternate embodiment of a hybrid washing machine for ozone treatment.
Figure 12:
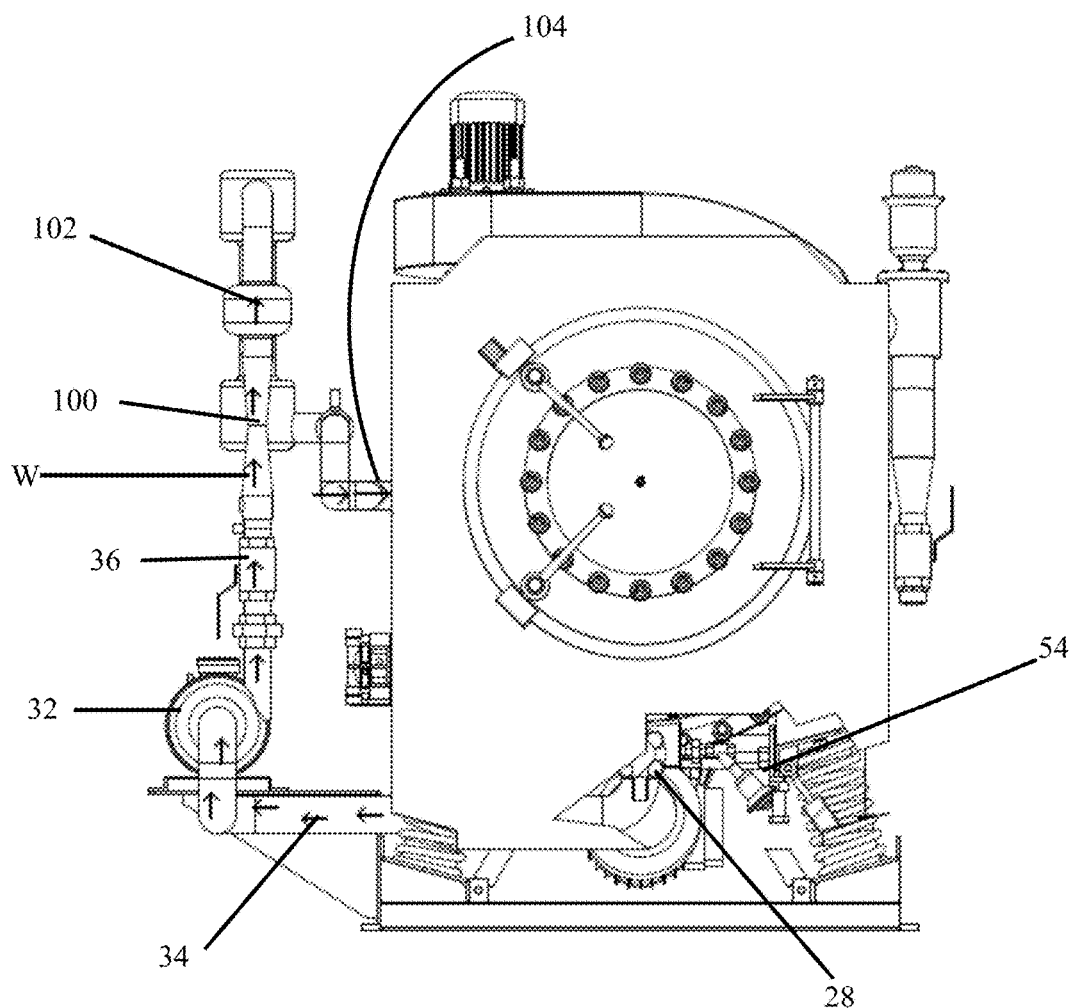
FIG. 12 shows a front plan view of the machine of FIG. 11.
Figure 13A:
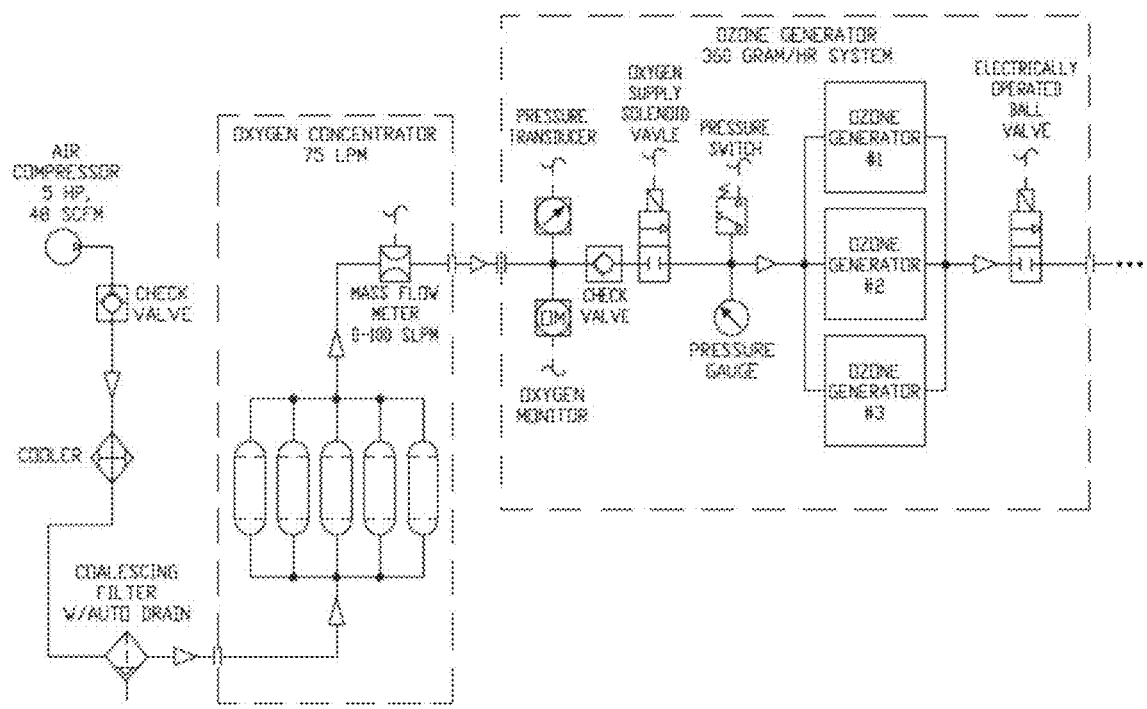
FIGS. 13A and 13B show a schematic illustrating various components of an ozone bleaching system.
Figure 13B:
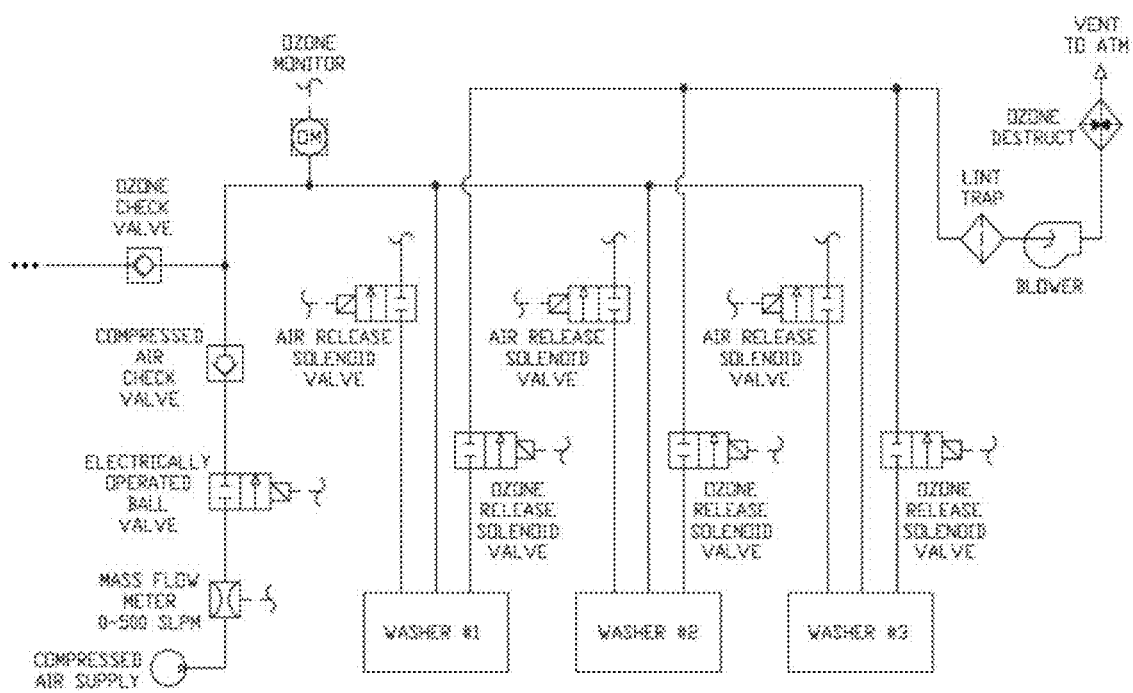

A fluid or water re-circulation path is shown by arrows "W" in FIGS. 9 and 11. The fluid may flow in a continuous loop. A fluid recirculating pump 32 may be provided for maintaining a flow of water between the barrel 24 and the venturi injector 100. Fluid recirculating pump 32 may have a pump inlet line 34 and a pump outlet line 36. The pump inlet line 34 may have a barrel connection point 56 at the barrel 24 and a pump connection point 58 at the pump 32. The pump outlet line 36 may have a pump connection point 60 at the pump 32 and a barrel connection point 64, leading back into the barrel 24. In one embodiment, the fluid recirculating pump 32 is a pump capable of pumping lint. This can ensure that the pump can accommodate and provide proper flow through the system. Once the bleaching treatment cycle has been completed, any water remaining in the barrel 24 may exit through drain 28. FIGS. 11 and 12 show water flow "W" through the alternate hybrid washing machines of FIGS. 6-8.

FIGS. 20-23 illustrate an alternate embodiment, in which the barrel connection point 64' (for the pump outlet line 36' carrying water being recirculated back into the barrel 24') is located along an upper portion 500 of the barrel 24'. This can help ensure that water is more evenly distributed in the barrel. In this embodiment, the garments to be treated are generally located beneath the water re-entry point 502.

Figure 23:
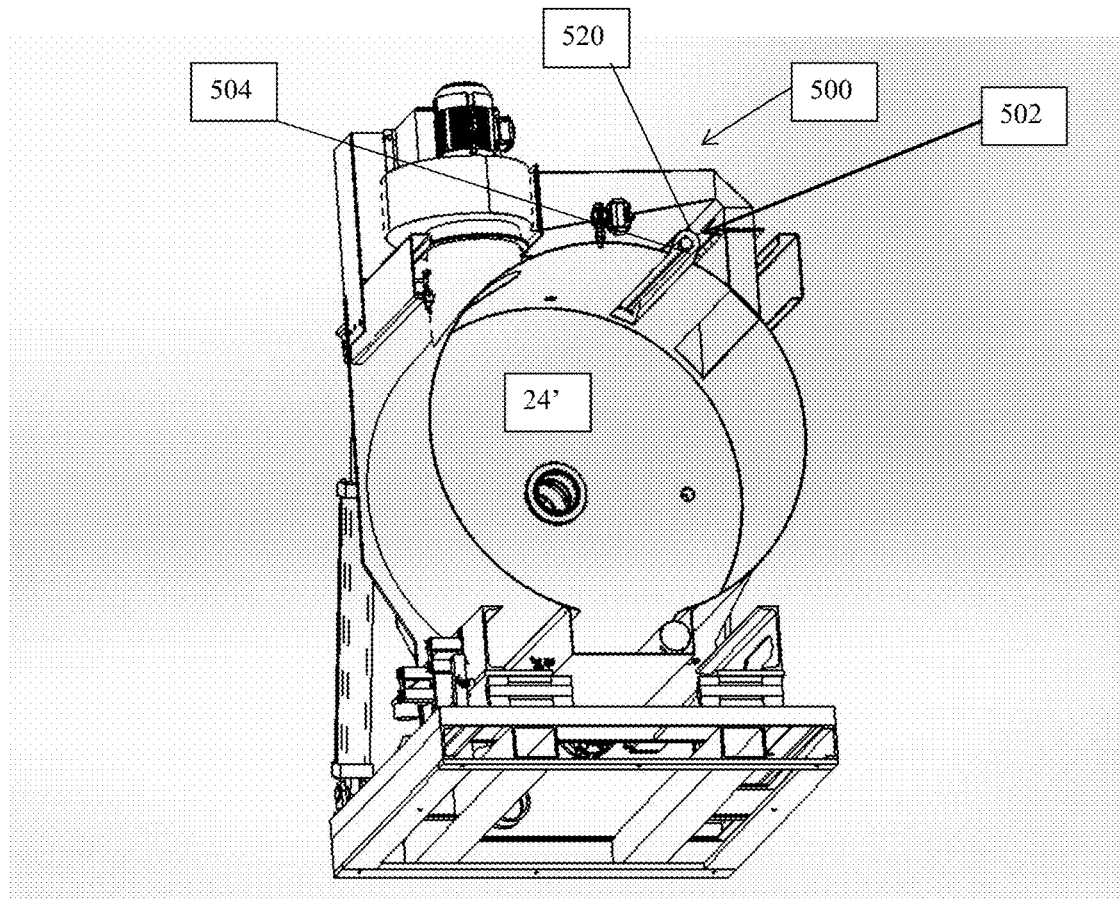
FIG. 23 shows a perspective view of the machine of FIGS. 20-22.
Figure 24:
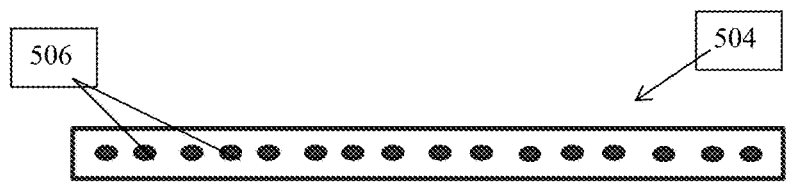
FIG. 24 shows a schematic view of a spray bar that may be used with a hybrid washing machine.

Additionally, there may be provided a spray bar 504 positioned along the barrel. An exemplary spray bar 504 is illustrated by FIGS. 23 and 24. The figures show the spray bar 504 located along an upper portion 500. It should be understood, however, that it is possible a spray bar 504 to be used as an initial point of ozonated water entry, as well. For example, a spray bar may additionally or alternatively be positioned along the water inlet 26.

The spray bar 504 allows water to be injected into the top of the barrel 24' in a continuous and more even spray. Openings 506 along the spray bar cause the water to be dispersed along the bar 504, rather than having water injected at only a single entry point. Use of spray bar 504 can allow water to contact the garments more evenly. The openings 506 may be holes that are made along the bar body. In other examples, the openings 506 may be fitted with one or more spray jets or nozzles that can disperse or spray the water more finely or evenly.

The spray bar 504 may have a length that extends the length or depth of the barrel 24', as illustrated by FIG. 23.

This allows a full spectrum of water to be sprayed in use. The spray bar 504 may be mounted into the actual body of the barrel housing 508. In another example, the spray bar 504 is mounted in a curved enclosure 520 that is formed into the barrel. This is the example illustrated by FIGS. 22 and 23. This means that rather than injecting water back into the machine at a door or other side port, the water is injected into the top of the barrel.

Figure 22:
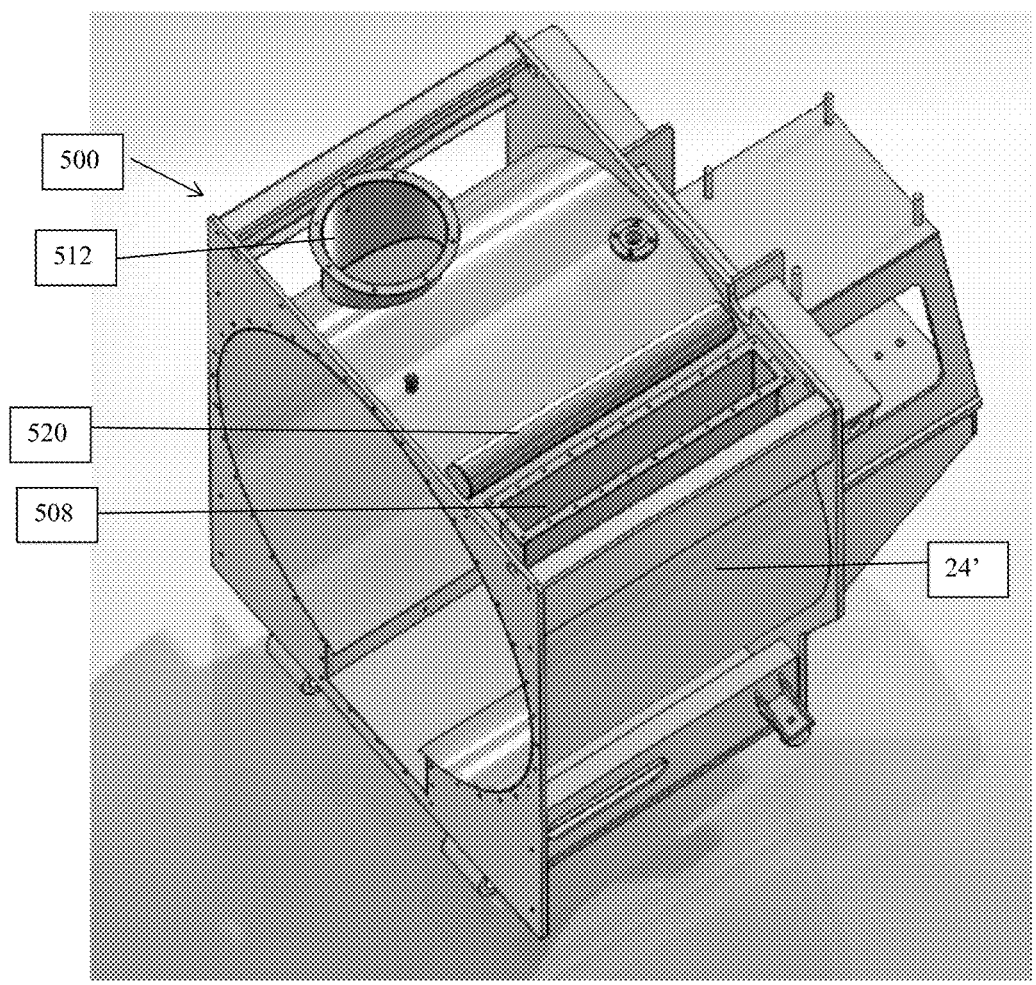
FIG. 22 shows a top plan view of a machine with the blower ducting removed, illustrating the blower duct inlet, the blower duct outlet for recirculation, and a spray bar.

As illustrated by FIG. 22, it is possible for the spray bar 504 to be directly adjacent to the blower circulation duct 508. The blower circulation duct 508 is where ozonated air may be recirculated into the machine (after initially being injected at the blower inlet 512). The spray bar 504 is where ozonated water may be recirculated back into the machine.

Figure 15:
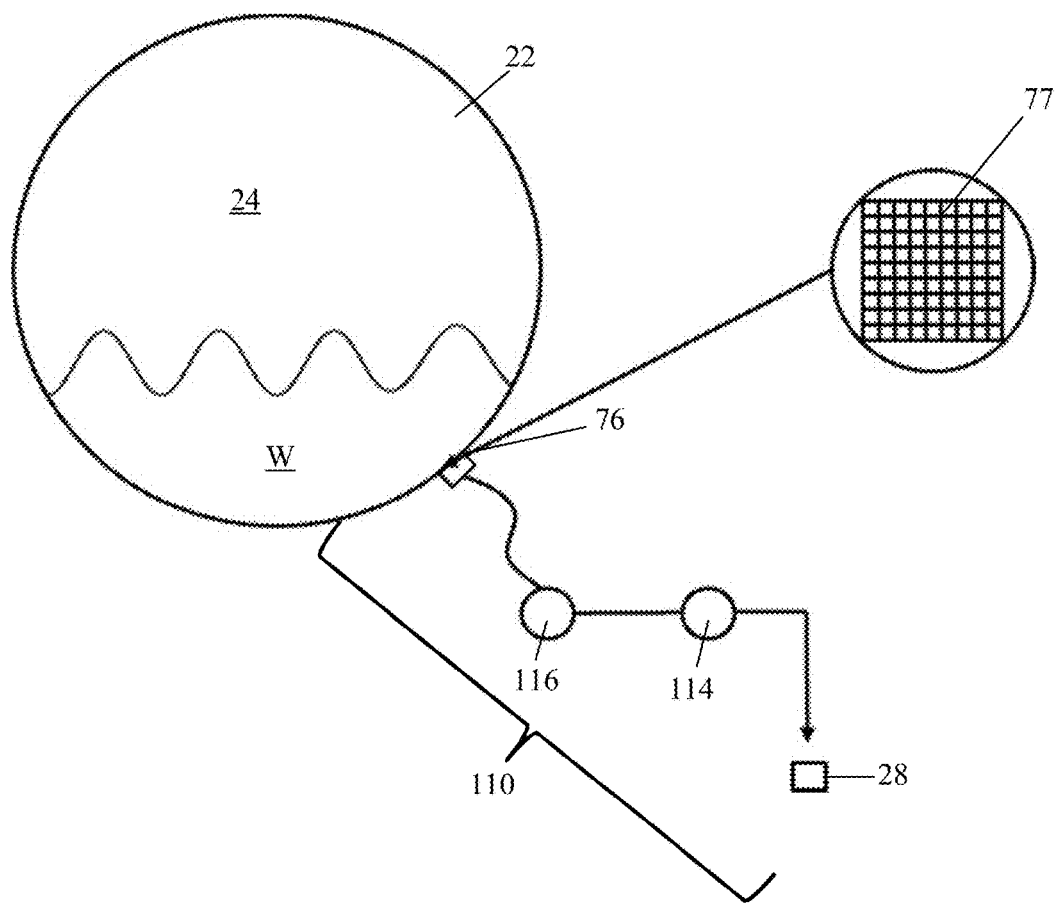
FIG. 15 shows a schematic of a water sample point on a hybrid washing machine.
Figure 16A:
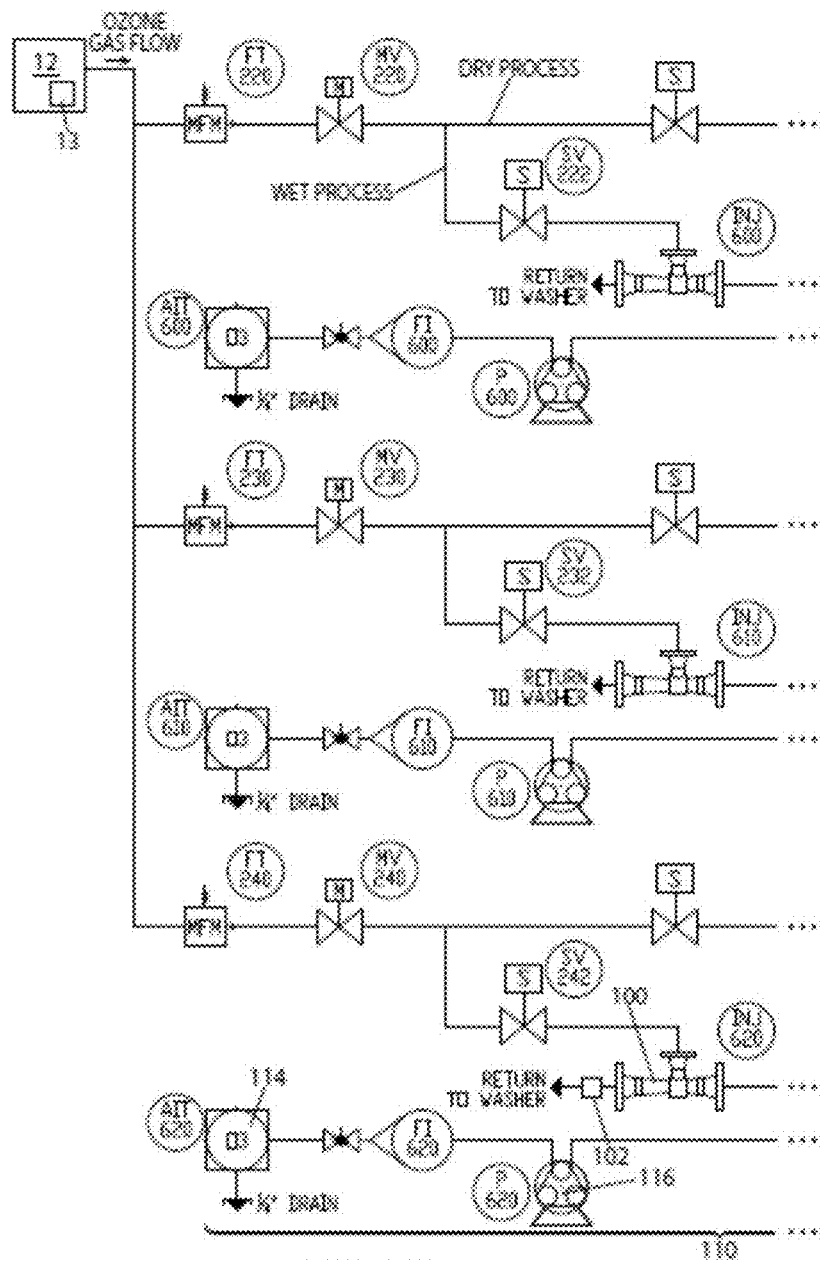
FIGS. 16A and 16B show a schematic of ozone gas flow whether used in a dry process or a wet process. These figures also illustrate that a single ozone generator may supply multiple ozone treatment components.
Figure 16B:
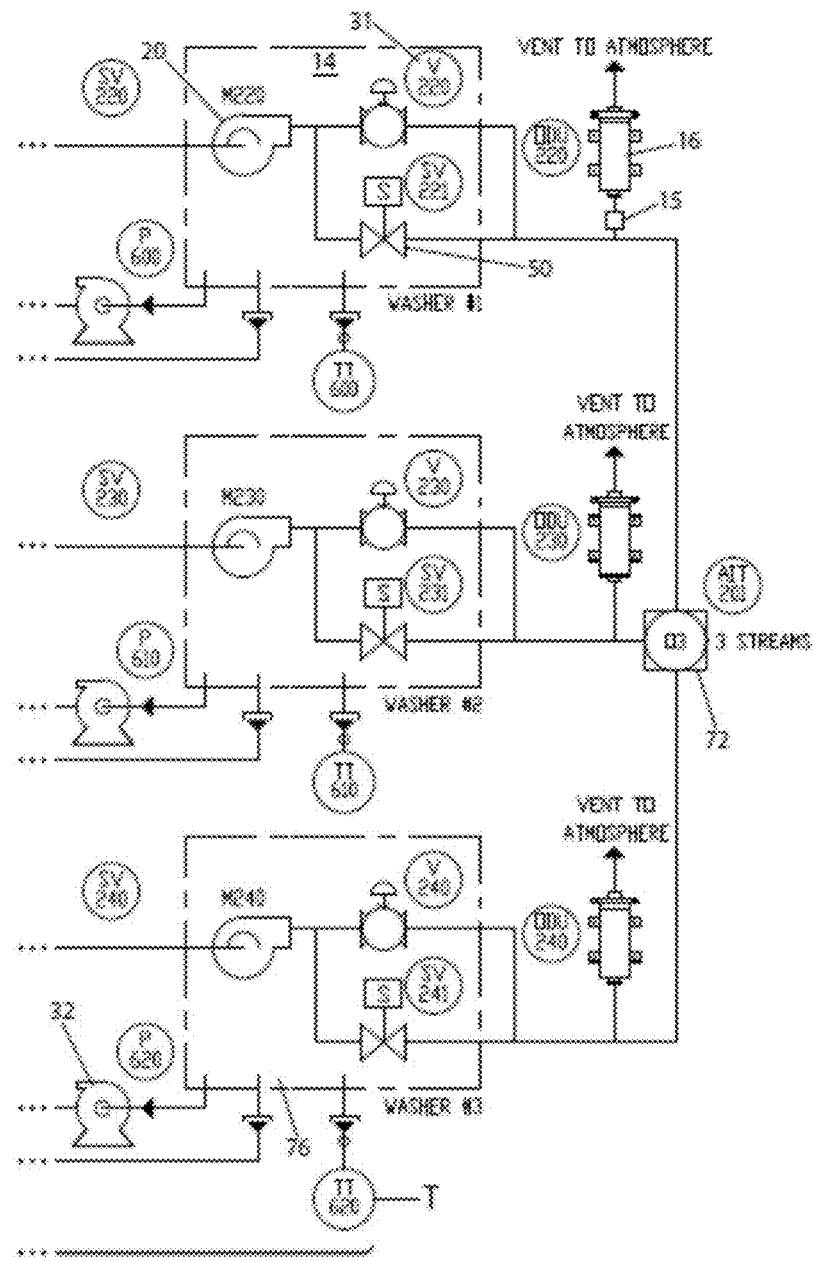
Figure 17:
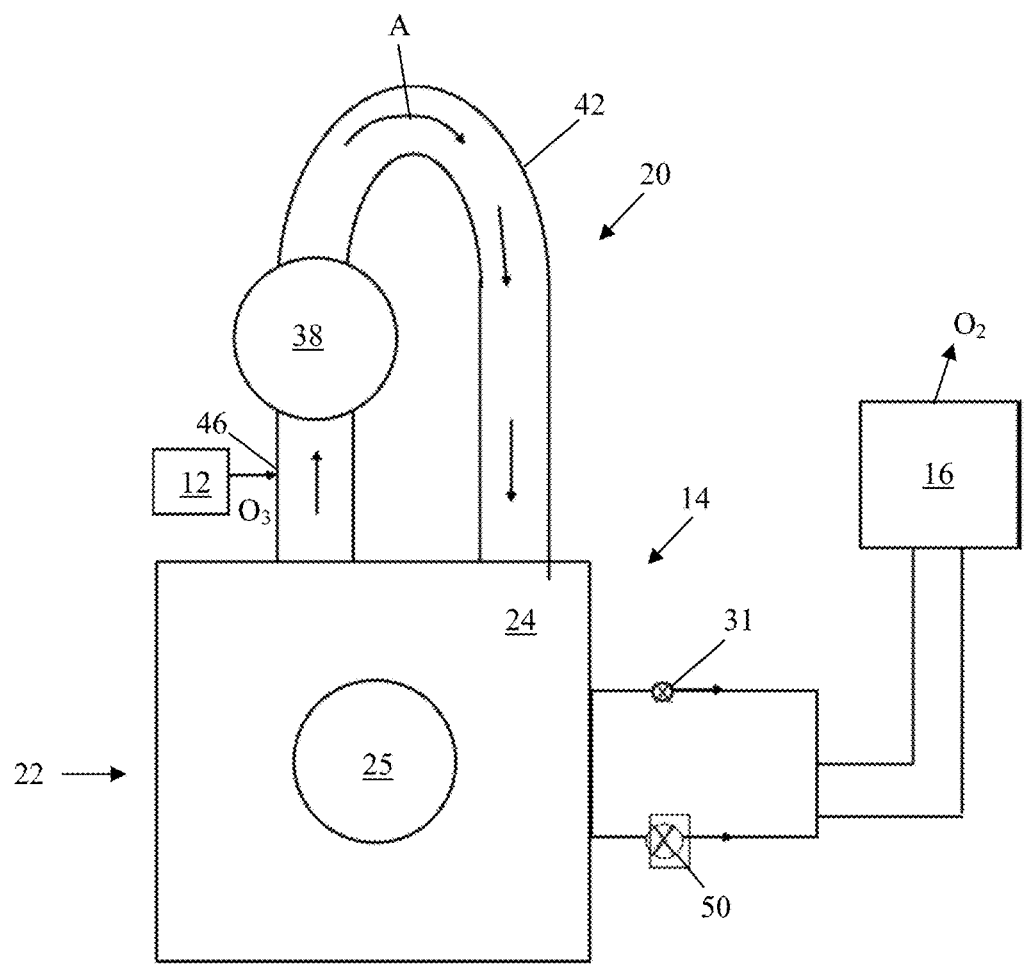
FIG. 17 shows a schematic of a dry process treatment.

In order to properly dose during the wet bleaching process, it may be desirable to provide a dosing check loop 110, as shown in FIGS. 15, 16, and 18. The dosing check loop 110 may include a sample point 76, at which water may be removed from the barrel 24 of the hybrid washing machine 14. The sample point 76 may be used for obtaining sample water out the machine 14, without the need for filtration. In one embodiment, the machine 14 may be designed with a fine mesh lint screen 77 that is screwed into the washer body via a custom fitting that may be welded onto the washer body in production. Water naturally flows through the screen and out of the washer, into a small void in a sample device. In one example, the water to be tested is allowed to leak out of the machine using gravity force.

FIG. 16 illustrates a schematic of an exemplary dosing check loop in combination with ozone gas flow. The sample volume may then be pumped through a dissolved ozone sensor 114 via a small peristaltic pump 116. The dosing check loop system may also be provided with a temperature sensor T in order to measure the ozone washer temperature level. This data may help the system obtain accurate readings in order to alter ozone dosing. The dosing check loop 110 may be used to ensure that the water being circulated through the machine 14 is properly ozonated at the desired concentration.

In one specific embodiment, the dissolved ozone sensor 114 may be a fast response, high-range dissolved ozone sensor that is used to maintain a programmed set point for ozone dosing during a wet bleaching process. The dissolved ozone sensor 114 may be designed to measure up to 20 PPM of dissolved ozone, controlled precisely by the PID loop.

In order to accommodate for the sample water removed, there may also be provided a water makeup system. In one specific example, the water makeup system may include a solenoid valve and a roto-meter. In another example, the makeup water system may pump tested water directly back into the system. In a further example, makeup water may be added through the water inlet 26. In any event, the water makeup system may be used to replace sample water that has been removed from the machine at a rate that is generally equal to the water loss. This can ensure that proper water volume is maintained throughout a complete wet ozone bleaching process.

The wet process features may be designed to operate without the need for filtration. For example, the dynamic gas reactor 102 may be designed without edges or baffles that would otherwise trap lint. This can eliminate filter cleaning as a maintenance item. A clogged or inoperable filter may cause a critical variable or process failure point. In another embodiment, it may be possible to blow compressed air against the lint screen mesh 77 in order to keep the sampling port 76 accessible.

Bleaching Processes.

As discussed, it is possible to use the ozone bleaching system 10 for use with dry processes, wet processes, and/or humid/steam processes. In one example, the dry process may include the following process steps. Although the steps are numbered for ease of review, they may occur in any appropriate order:

1. Enter garment weight and select desired process program number on washer 14 user interface screen.
2. Load garments into barrel 24; close door 25.
3. Close fresh air valve 30, close ozone destruct valve 50. Begin ozone generator 12 warm up.
4. Start air circulation/blower component 20 and ozone injection into ozone inlet 46.
5. Once desired ozone level is reached, a timer on the user interface may count down (for operator information) and the system may maintain dosing of ozone at the indicated level for the appropriate time duration (as described further below). As ozone is injected/circulated, the pressure port 31 will bleed a small amount of ozonated gas to the ozone destruct unit. (This is likely to be controlled by the computer that is used to set the bleaching the factor, but it should be understood that these steps may be conducted manually, if desired.)
6. When the process is finished, ozone injection is stopped.
7. Ozone destruct valve 50 and fresh air valve 30 opened, and ozone destruct unit 16 then catalyzes ozone until a safe concentration is reached (as indicated by a sensor). The blower 20 forces air out of the barrel 24 and into the ozone destruct unit 16.
8. Air recirculation is stopped.
9. Appropriate rinsing and/or finishing steps may then be completed. For example, the garments may be rinsed with water with steam heating. Water may be delivered, drained and extracted (for example, by spinning of the barrel). (It should also be understood that rinsing and/or pre-wetting steps may also accompany the dry process, and would generally take place prior to #3 above.)

In another example, the wet process may include the following process steps. Although the steps are numbered for ease of review, they may occur in any appropriate order:

1. Enter garment weight and select desired process program number, on washer 14 user interface screen.
2. Load garments into barrel 24; close door 25.
3. Close fresh air valve 30, close ozone destruct valve 50. Begin ozone generator 12 warm up.
4. Open water valve 26 and fill machine to proper water level.
5. Start venturi injector 100 and injection/re-circulation of ozonated washer into inlet 104. Fluid recirculation pump 32 maintains flow of ozone-depleted water out of the barrel 24, through the venturi injector 100 to add ozone back into the water, and delivers the re-ozonated water back into the barrel 24.
6. The system may maintain dosing of ozone at the indicated level for the appropriate time duration. As ozonated water is injected/recirculated, a water testing/measuring loop may pull out a small amount of ozonated water for testing and to provide feedback to the computer about the amount of ozone to be injected at the venturi injector 100 in order to maintain the set dissolved ozone level, for the programmed bleaching process.
6. When the process is finished, ozone injection is stopped, circulation pump 32 is stopped, and drain 28 and fresh air valve 30 are opened.

7. Appropriate rinsing and/or finishing steps may then be completed. For example, the garments may be rinsed with water with steam heating. Water may be delivered, drained and extracted (for example, by spinning of the barrel).
8. At the completion of the entire wet bleaching process, excess water in the barrel 24 is removed via drain 28.
9. Prior to beginning a new ozone bleaching cycle, the water recirculation lines 34, 36 may be flushed via the pump 32 with the drain 28 open, so that the new cycle begins with a clean system.

The hybrid washing machine embodiment described herein thus provides the benefits of a commercial washing machine, along with the high volume blower of a commercial dryer. Additionally, one of the additional benefits of the hybrid washing machine is that it can be used for "normal" washing procedures with no ozone applied. This features adds to the versatility of the equipment. It is possible to use the machine 14 as a dry process, in which the water recirculation flow is not used. It is also possible to use the machine 14 for wet ozone bleaching, due to the presence of the fluid recirculating pump 32. Thus, the ozone bleaching system 10 allows wet processes or dry processes to be conducted in the same machine. It also allows for ozonation process or can be used for normal washing processes when no ozonation process are to be run by the facility. Providing a fluid re-circulating pump 32, a venturi ozone injector 100, and an integral blower component 20 on a single hybrid washer 14 delivers a system that provides a complete process solution for chemical treatments, neutralizing, wetting, wet ozone, damp ozone gas application, dry ozone gas application, oxidation by-product removal, and final extraction—all in one machine. For example, once the ozone treatment has been completed, water may be re-circulated through the machine for a rinsing process. Use of the system described herein does not require removal of the textiles from one machine to another. Instead, all processes may take place in the same treatment component/machine.

The hybrid washing machine blower component 20 may be a variable speed blower that can controlled by the machine PLC to provide different air circulation speeds for dry ozone bleaching processes. The blower component 20 may be oversized so that it can generate more air circulation flow than the blower outlet duct 42 can pass into the washer. The restriction created in the blower component 20 outlet duct will generate heat in the machine barrel. This feature can be used to quickly dry the barrel of the machine, after a washer program is completed and garments are removed. Dry bleaching process may then follow wet machine processes, without an extended wait for the machine to dry.

The hybrid washing machine embodiment provided by this disclosure thus prevents operators from having to prepare wet textiles in one machine and then move the wetted textiles to the ozone process machine. This takes time and labor and can cause varied wetness across various loads of the same product type. Moreover, previous machines provided only gas volume ozone "destruct" after the process, without any way to rinse in the same machine. Again, this takes time and labor to move the textiles back to another machine for rinsing and extracting, or to a dryer for drying.

To save time, many operators of prior art machines did not rinse after the ozonation process. This left unreacted die materials in the fabric. These materials have a chemical smell that remains in the fabric, after packaging. This has given a negative image to ozone-processed products (because of the smell when products are unpackaged). By integrating the wetting, ozonation, and rinsing processes into the same machine, these problems can be avoided.

Ozone Dosing.

Figure 14:
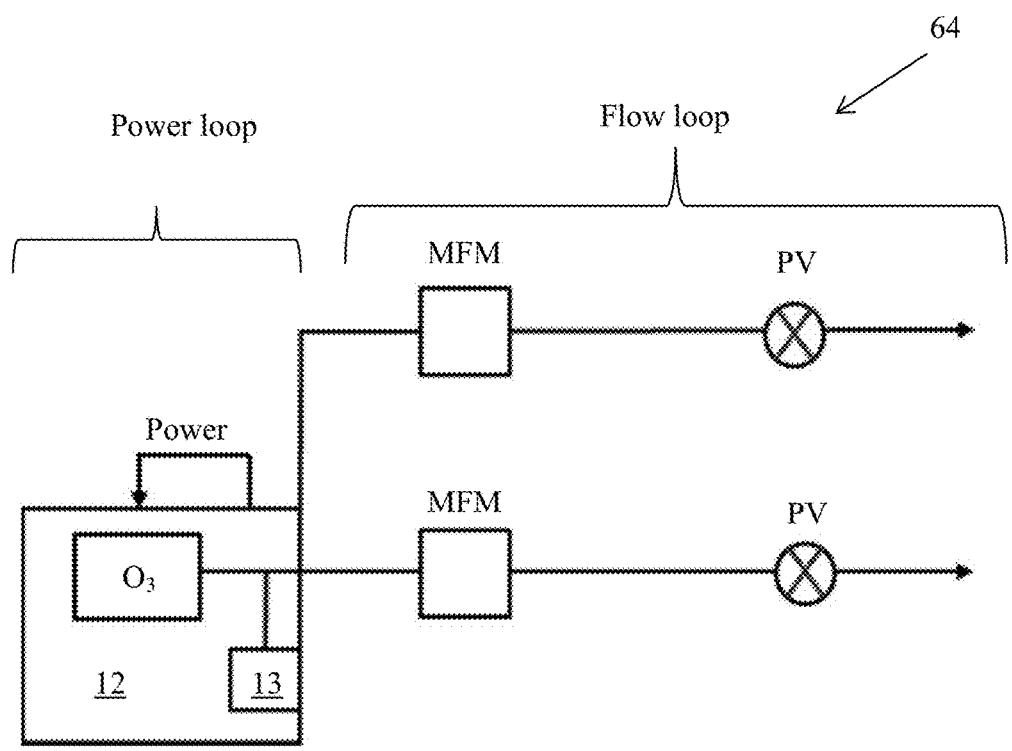
FIG. 14 shows a schematic illustration of one embodiment of an ozone dosing control system.

The ozone generator 12 may also include an ozone dosing system control 64. One example of a dosing schematic is illustrated in FIG. 14. The dosing control system 64 allows a single ozone generator 12 to deliver ozone to multiple textile ozone treatment components 14/hybrid washing machines. The dosing control system 64 is designed to control the concentration of ozone delivered so that the ozone concentration may be held constant as the flow rate increases and/or decreases. In one embodiment, the dosing control system 64 may include a proportional integral derivative (PID) controller. The general goal is to maintain the concentration of ozone in the gas that is delivered to each component 14/hybrid washing machine at a constant dosing concentration. Maintaining a constant dosing concentration of ozone allows the process to be reliable and repeatable.

FIG. 14 shows a schematic illustrating information flow for dosing control. The ozone generator 12 may have a high ozone concentration analyzer 13 associated therewith. The bleaching factor may be set at grams of ozone to be delivered per hour per weight of textiles (g/hr/weight units). In one specific example, the weight of textiles is measured in kilograms, such that the bleaching factor may be expressed as (g/h/r/kg). A software program/computer associated with the system may be designed to receive that input and create the proper ozone flow based thereon. A first PID loop measures and controls the power delivered to the ozone generator. A second PID loop measures and controls the ozone gas flow rate. The second PID loop may include a mass flow meter (MFM) and a proportional valve (PV). The system may adjust the ozone flow and the generator power in order to achieve the desired output in grams per hour at a desired specified ozone concentration. This allows a constant concentration of ozone gas to be applied based on the weight of textile to be treated.

In one example, the dosing control system 64 delivers the same amount of ozone per unit weight, regardless of the number of machines 14 being serviced by the ozone generator 12 and its ozone dosing system 64. This constant concentration may be referred to as a "bleaching factor." In one example, the bleaching factor is defined as the rate of ozone production per kilogram of denim (or other textile) material, generally based on dry weight. Multiple treatment machines of different sizes may call for different amounts of ozone, but by maintaining a constant dosing concentration by weight constant (e.g., 5-20%/wt %), the treatment process conducted by all machines may result in a similar bleaching factor delivered to textiles treated by the different machines. The dosing system provides rate equations such that dosing may be done automatically by the computer controlling the ozone generator 12.

By contrast, prior art machines have not addressed specific dosing of ozone or the concentration by weight concept. Instead, they focused only on measuring ozone once it was delivered to the machine. Once operators loaded textiles into an ozone processing machine, they could not set a bleaching factor (i.e., a rate of ozone production per kilogram of textile) to be delivered. Instead, they had to input several process variables, such as time, ozone generator power output, destruct time, among others. Sensors inside the machines gave a reference of the ozone in the machine, but they did not control level of ozone present via PID loop. The results of treatment depended upon expertise and knowledge of the operator, as opposed to a consistent and reliable setting. The present inventors have solved this problem, at least by recognizing the benefits of dosing ozone vs. measuring ozone already in the machine.

In one embodiment, the ozone generator 12 of the ozone bleaching system 10 may use an ozone analyzer 13 in order to supply an exact dose of ozone in the gas processes. In one example, the ozone analyzer 13 is a high concentration ozone analyzer. In one example, the ozone analyzer 13 may provide precise ozone dosing by maintaining a constant concentration by weight. The dose may be controlled by providing a specified amount of ozone at a constant concentration by weight. This will allow for programming of a given "grams/hr/kg of fabric" dose of ozone, at a specific programmed ozone gas concentration by weight, to be supplied for any number of formulas. Previous systems have simply used high level sensors to measure the resulting ozone level in the washing machine, as a function of the power percentage setting programmed in before each cycle. They have not used ozone analyzers in the ozone generator itself. They also have not used active PID or % wt concentration controls utilized on previous ozone bleaching systems.

Each system may be provided with a programmable logic controller (PLC). A specific ozone bleaching system may provide ozone dosing and concentration controls programmed into washer formulas. The valves and ozone flow may be controlled by the PLC, as illustrated by FIG. 16. When a particular formula is selected in the washer programmer, the ozone dosing information is communicated to the ozone system's PLC. In one example, there may be a custom equation designed for the ozone system. The equation may calculate the ozone delivery from the data entered into the washer programs. For example, the operator need only enter the weight of garments put into the machine (generally in kilograms) and a desired fabric bleaching factor (measured by g/hr/kg). The ozone concentration by mass can be calculated without any further operator input, and the process equation may be run by the machine automatically. Multiple actuation signals may be communicated between the washer and the ozone system during an ozone wet or dry process. Exemplary communications include but are not limited to an "operational ready" signal, and signals indicating when to add ozone, how much ozone to add, and the type of ozonation method to use (e.g., wet vs. dry). The communications may also include control of some of the washer process valves by the ozone generator system 12. These signals are received by the ozone dosing control system 64, and the system 64 implements changes. They are not operator dependent.

In one embodiment, the wet processing part of the process may allow for a precise dose of water in liters, with an analog flow meter, to each load for uniform pre-wetting of garments. This feature may be used in flushing dye, pre-wetting, equalizing moisture content, and removal of dye and unreacted dye materials.

In one example, the hybrid washing machine 14 has controls that integrate the washer-related functions with ozone systems. These controls may be represented on a control panel or other appropriate user interface. The panel may be a touch screen, may have knobs/levers, may have buttons, or any other appropriate input mechanism.

In one specific embodiment, the washer machine may be a Tupesa machine and the ozone generator system may be a Guardian Manufacturing, Inc. ozone generator system. The ozone generator 12 may allow for modular expansion of ozone output capability and number of washers that are utilized. The system can simultaneously provide individualized ozone output to a single washer or to multiple washers, from a single ozone system. The combination of integrated controls with the machine and ozone system can provide precise and repeatable processes for the textile industry. For example, the ozone bleaching system 10 can allow operators to create and tailor formulas for specific processes to be run over and over in order to produce tens of thousands of product pieces, with uniform results. The various production programs, with cycle steps and ozone bleaching factor, may be programmed directly into the washers. In this example, each hybrid washer machine 22 will then communicate with the ozone generator 12 to "request" the amount of ozone needed to be sent for each process formula. These dosing controls can allow the textile producer to easily train employees on the automated process use. The washer and ozone system dosing control system 64 can ensure precise wetting, ozone dosing, neutralizing, rinsing, and extracting for any number of customer designed applications.

A series of valves and check valves may be provided for proper timing of machine pressurization, continuous process flow when needed, and for controlled ozone gas removal when needed in both dry and wet ozone processes. Such valves may be provided at or near the water inlet 26, the ozone inlet 46, the ozonated water inlet 104, and/or the ozone destruct outlet 52 (i.e., the ozone destruct valve 50).

It should be understood that all of the components used in connection with the ozone bleaching system 10 described herein may be designed to be ozone compatible. Exemplary materials include, but are not limited to, stainless steel, or any other appropriate materials. In specific examples, the barrel and other materials in contact with ozone are made of SS316L stainless steel; the door gasket may be made with silicone; the pneumatic valves may be made with PTFE (Teflon) or Kalrez; the bearings and oil seals may be made with a synthetic rubber and flouropolymer elastomer, such as Viton. These specifics are provided as a single example and are not intended to be limiting in any way. The general goal is to provide all system components, seal components, and other components of a material that is compatible with ozone in order to prevent degradation of the seals/components and to prevent leakage of ozone from the system.

In some examples, there is thus provided an ozone bleaching system, comprising: an ozone generator comprising an ozone dosing control system; a textile ozone treatment component fluidly coupled to the ozone generator, the textile ozone treatment component comprising a barrel for containing textiles to be treated and an integrated blower component for circulating ozonated air through the barrel; and an ozone destruct valve fluidly coupled to an ozone destruct unit. Ozone injected into the textile ozone treatment component may be recirculated by the blower component.

In some embodiments, the system may also include a fluid recirculating pump. This allows the textile ozone treatment to be used for wet and dry processes. In this embodiment, the system may also include a venturi injector for injecting ozonated water into the barrel.

In another embodiment, the ozone dosing control system may control a concentration of ozone delivered to the hybrid washing machine so that the ozone concentration in the machine is held constant as the flow rate increases and/or decreases.

Further embodiments provide a hybrid washing machine for use in ozone bleaching, the machine configured for use with dry ozone processes and wet ozone processes, comprising: a barrel for containing items to be ozone bleached; an integrated blower component for circulating ozonated air throughout the barrel; an ozone air inlet; an ozonated water inlet; a fluid recirculating pump; a decompression valve; and an ozone destruct valve fluidly coupled to an ozone destruct unit.

One exemplary method for dry treating textiles to be bleached with ozone, comprises: loading textiles into a hybrid washing machine/blower system as described; delivering water into a water inlet in order to wet the textiles prior to treatment; removing excess water from the textiles; injecting ozone into the barrel of the system; circulating ozone through the system using the blower component; maintaining and appropriate pressure of the barrel using the decompression valve; and evacuating ozone from the barrel via the ozone destruct valve for direction to the ozone destruct unit.

Color Removal Process.

The reaction rate of ozone with indigo and other dyes in the process water is rapid. The reaction is often so rapid that that ozone dosed into a water containing dyes, flowing at rates of over 100-400 gallons per minute, will be mostly consumed before that water travels even a few feet in a pipe. This is especially true when a dynamic gas reactor is used immediately after the ozone vacuum inductor to increase gas to liquid contact efficiency.

However, this rapid reaction allows for a properly controlled dose of ozone to be used to remove excess dye in the water in a side-stream loop, without creating an elevated level of ozone in the treatment water to which the textiles are exposed. Accordingly, an "ozone water cleaning" or "color removal" step may be included with the denim processing/ozone bleaching cycles described herein. It has been found that this water cleaning process can further enhance the benefits of the ozone gas bleaching processes described.

It has also been found that reducing the number of rinses required during the process can greatly reduce the amount of water required. In one example, reductions of up to 90% may be achieved. This can happen by reducing a full wash program to only two or three water fill steps, where one or two of those water fill steps can be reuse water from a downstream water reuse system. It can also reduce the amount of time required for the textile processing operation. This process can also eliminate chemical and/or temperature neutralizing steps that might otherwise be required in order to deactivate, or kill, residual enzymes used in denim processing. (A kill step is normally needed to prevent the further degradation of the garment material, beyond the desired level with the chemistry levels being used.) Eliminating this extra step and use of chemicals is beneficial and can lead to cost savings. The present inventors have found that ozone can be used to remove residual dyes such as indigo dye, sulfur dyes, reactive dyes, direct dyes, vat dyes, pigment dyes, acid dyes and any other dyes from denim processing water. It is also believed to be potentially beneficial in removing other dyes from various processing water environments.

In one example, water dye/color removal is conducted with ozone, before the ozone gas bleaching process. This can remove a kill step and extra rinses. Instead, only one dump and fill of the machine may be needed prior to the ozone bleaching steps. Using the ozone treatment for color removal during a water step with recirculation may cause excess dyes/color that may be present to be removed from the water and oxidized by ozone in the water stream. (Processes described herein may also be used to remove dyes from the garment itself. For example, excess dye can be rinsed from the garment in a first, or subsequent, rinse normally. The ozone treatment in circulation continue removing color from the water as it is released during a rinse step. It has also been found that running the ozone process for longer (e.g., after the free dye in the water is gone), can help to remove more free dye from the garment itself. This can eliminate the need for further rinses, after the first one, when an ozone bleach step may not follow.)

The evenly rinsed garments, free of any excess indigo, can now be bleached more evenly with ozone gas using the above-described processes. (It should be understood that this water cleaning/dark removal step may be used with other bleaching processes as well.) However, combining the processes of water ozone treatment with the described bleaching processes provide benefits over traditional water dilution rinses.

It is believed that ozone color removal may add about 3 to 4 minutes to the desizing and washing steps in enzyme processing; however, the overall cycle time is reduced by reduction in the rinse steps that are required. Below is one example of a denim wash formula using ozone color removal and ozone gas bleaching. This example is based on the weight of denim to be treated:

EXAMPLE 1

Denim Wash Formula Using Ozone Color Removal and Ozone Gas Bleaching Formula

| Cycle Step | H2O Liters/ Denim Kg Ratio | Chemical | Temp | Time Minutes |
|---|---|---|---|---|
| Fill | | | | 3 |
| Desize | 6 | Enzyme | 55 C. | 15 |
| Color Removal | | Wet Ozone | | 5 |
| Drain & Refill | | | | 2 |
| Stone Wash | 4 | Stones | 50 C. | 90 |
| Color Removal | | Wet Ozone | | 10 |
| Drain & Refill | | | | 2 |
| Rinse | 5 | | | 5 |
| Drain | | | | 1 |
| Pre Extract | | | | 2 |
| Ozone Medium Bleach | | Dry Ozone | | 10 |
| Fill | | | | 2 |
| Neutralize Rinse | 5 | Neutralizer | 40 C. | 5 |
| Drain & Refill | | | | 3 |
| Clear Rinse | 4 | — | | 3 |
| Drain | | | | 1 |
| Totals 200 kg of Denim (~180 to 220 pairs of jeans) | 4,800 Liters | | | 159 Minutes |
| | Actual water use and time will vary in customers desired process. | | | |

For comparison purposes, it is useful to compare these steps to a traditional denim washing and bleaching formula:

EXAMPLE 2

Traditional Denim Washing and Bleaching Formula

| Cycle Step | H2O Liters/ Denim Kg Ratio | Chemical | Temp | Time |
|---|---|---|---|---|
| Fill | | | | 3 |
| Desize | 6 | Enzyme | 55 C. | 15 |
| Drain & Refill | | | | 3 |
| Rinse | 7 | — | 40 C. | 5 |

-continued

| Cycle Step | H2O Liters/ Denim Kg Ratio | Chemical | Temp | Time |
|---|---|---|---|---|
| Drain & Refill | | | | 3 |
| Rinse | 7 | — | 40 C. | 5 |
| Drain & Refill | | | | 2 |
| Stone Wash | 4 | Stones/Enzyme | 50 C. | 60 |
| Drain & Refill | | | | 4 |
| Rinse | 7 | Enzyme Kill | ? | 7 |
| Drain & Refill | | | | 4 |
| Rinse | 7 | — | — | 5 |
| Drain & Refill | | | | 4 |
| Rinse | 7 | — | — | 5 |
| Drain & Refill | | | | 3 |
| Chemical Bleach | 10 | Hypochlorite | 45 C. | 30 |
| Drain & Refill | | | | 4 |
| Rinse | 7 | — | — | 5 |
| Drain & Refill | | | | 3 |
| Neutralize Rinse | 10 | Neutralizer | 40 C. | 15 |
| Drain & Refill | | | | 4 |
| Clear Rinse | 7 | — | — | 3 |
| Drain | | | | 1 |
| Totals | 15,800 | | | 193 |
| 200 kg of Denim | Liters | | | Minutes |
| (~180-220 pair of jeans) | Actual water use and time will vary in customers desired process. | | | |

As illustrated, there are many more drain & refill steps in the traditional process. The disclosed process helps remove a number of these rinse, drain and fill steps by removing dyes during one or more steps in the process, when the water is in the machine.

More specifically, the water cleaning process for the above example may include the following steps. (It should be understood that the weights and times, step order, and percentages provided are for illustrative purposes only and may be changed based on different requirements). In these steps, the machine and the ozone system communicate with one another. The machine control system indicates how much ozone to dose in the color removal process and the gas bleaching steps. It may use a calculation based on the total weight of the garments being washed.

Step 1: Machine Loading and Formula Selection

Once the machine is loaded with the appropriate total weight of denim or garment to be bleached (in this example, 200 kg), the operator selects the correct machine program for the denim loaded and starts the machine.

Step 2: Desizing and First Color Removal

In this example, the machine will fill with water to the programmed volume. Desizing chemistry (normally enzymes) may be added. The machine increases temperature, adding steam as needed in order to raise temperature to desired level. It tumbles the denim for a programmed amount of desizing step time, depending on the treatment to be applied. At the end of the programmed desizing time, the machine may then activate the "Ozone Color Removal" process, prior to draining the water.

During the "Ozone Color Removal" process, the machine will start the fluid recirculation pump 32 to pull water out of the machine sump and push it through the venturi inductor 100 and dynamic gas reactor 102. The machine then sends a request to the ozone generator system 12, requesting the proper ozone dosage.

As an example, a wash program step was created with a water color removal factor of 10, at 10% ozone concentration by weight. The bleaching factor for a program's Color Removal step is determined by identifying which step in the wash formula should be treated and the fabric or garment type. This in turn will determine the amount of free dye expected in the water that will need to be oxidized with ozone.

The machine's programmable logic controller (PLC) will calculate the required ozone dose as Bleaching Factor of 10 (10 g/hr)×Load Weight (200 kg of denim), which equals 2000 g/hr, at the called for concentration by weight of 10%. Accordingly, in this example, the ozone generator will receive the request for 2000 g/hr @ 10% wt.

The ozone generator 10 will adjust the Proportional Flow Control Valve (PV) for the target gas volume for the required ozone dose. Each machine may be provided with an ozone compatible Mass Flow Meter (MFM) installed thereon, to work in conjunction with the Proportional Flow Control Valve and a PID to achieve proper flow rates to achieve precise Ozone Dosing, in each formula step that requires ozone. The ozone generator (10) powers up and adjusts the correct number of ozone generators (if more than one is provided) or generator racks that will be needed in order to deliver the current set total ozone output being called for by the machine(s).

The ozone generator (10) communicates with the machine when it is receiving the correct Ozone Dose to start the timer, for the programmed Color Removal step time. The amount of Color Removal time programmed into a program step may be determined by the amount of water volume present in the step, and the flow rate of the circulation loop on the machine. The pump (32) will need to run long enough to turn the water volume a sufficient number of times to allow the proper Ozone Dose to remove the dye color to a desired level.

When the machine timer for the color removal step expires, the machine relays and instruction to the ozone system to stop the ozone flow to the circulation loop. The machine will stop the circulation loop pump (32), and drain the water from the machine. Alternatively, the machine will continue to the next wash program step, continuing to use the same water, further reducing the total water needed in program.

Step 3: Stone Wash and Second Color Removal.

Color removal may also take place during stone washing. This may be in addition to or an alternate to the above described color removal during desizing. In this example, the machine is re-filled with water to a programmed volume or simply continues using the same water if a drain process was not performed. If Color Removal is programmed for the stone wash step, the machine and ozone generator will repeat the above processes to dose the proper ozone level, for the programmed time. The difference between the dosages for stone washing step and/or bleaching factor shows are examples only. The actual dose (or grams used) will vary with the types of fabric used, fabric finish, weight and fiber content, dye type, and other parameters. Water is drained from the machine and excess water is extracted from the denim to a desired moisture retention level.

Step 4: Rinsing and Third Color Removal.

Color removal may also take place during rinsing. This may be in addition to or an alternate to the above described color removal during desizing and/or stonewashing. The machine is then filled with water to a programmed volume. If Color Removal is programmed for the rinse step, the machine and ozone generator will repeat the above processes to dose the proper ozone level, for the programmed time. Water is drained from the machine and excess water is extracted from the denim to a desired moisture retention level.

Step 5: Ozone Gas Bleaching.

The denim is now ready for ozone gas bleaching step. In this step, the machine will slow down to the programmed tumbling speed programmed for the Ozone Gas Bleaching step. The machine will activate the integrated blower (20) in the cylinder (24) to circulate the air volume at a high rate.

The machine then sends a request to the ozone generator system (10), requesting the proper ozone dosage for the bleaching factor selected, as described above. The steps for calculation, turning on, and feeding the ozone remain constant, while the load type, weight and bleaching factors can vary. In one non-limiting example, a sample wash program step was created with a water color removal factor of 9, at 10% ozone concentration by weight. The bleaching factor for a program's Ozone Gas Bleaching step is generally determined by which step in the wash formula is being treated and the fabric or garment type, which in turn will determine the amount of free dye expected in the water that will need to be oxidized with ozone.

The machine PLC will calculate the required ozone dose as Bleaching Factor of 8 (8 g/hr)×Load Weight (200 Kg of denim), which equals 1800 g/hr, at the called for concentration by weight of 10%. The ozone generator (10) will receive the request for 1800 g/hr @ 10% wt. The ozone generator (10) will adjust the Proportional Flow Control Valve, for the target machine to send the correct gas volume for the required ozone dose. In another embodiment, the ozone generator supplies ozone to a pipe header that can feed multiple washers, and a Proportional Flow Control Valve is installed the machine. The PLC on each washer will adjust its own Proportional Flow Control Valve to flow the correct gas volume for the required ozone dose.

The ozone generator (10) powers up and adjusts the correct number of ozone generator(s) or generator racks needed for the current total ozone output being called for by the machine(s). The ozone generator (1) communicates the machine when it is receiving the correct Ozone Dose to start the timer, for the programmed Color Removal step time, as described above. The ozone gas is fed into the integrated blower outlet, for proper mixing into the machine cylinder (24) volume and proper contacting with the garments.

As ozone gas is continuously fed into the machine during an Ozone Gas Bleaching step, an equivalent volume of gas will exit the machine through an exit pipe and low cracking pressure check valve. The exiting gas flow will be directed to an ozone destruct unit.

During the Ozone Gas Bleaching step, the machine may have a humidity addition function that adds water back into the process in vapor form. The rate of water addition will be comparable to the evaporation rate caused by the dry oxygen and ozone feed gas entering the machine each minute, along with the drying effect of the high velocity airflow circulating in the machine cylinder. The equation for determining the water volume needed during an Ozone Gas Bleaching step may be written into the machine software, or the ozone generator software. In a case where the ozone generator calculates the water dose based on the gas flow needed to deliver the Ozone Dose, the water volume may be communicated back to the machine controller.

When the machine timer for the Ozone Gas Bleaching step expires, the machine communicates with the ozone system to stop the ozone flow to the blower outlet flow and to stop the blower.

Step 6—Neutralizing Rinse.

The machine is re-filled with water to a programmed volume. No ozone (dry or wet) is used in this step. Chemical neutralizer may be added to remove any unreacted dye material from the garments and to kill residual ozone. The machine will tumble for the programmed rinse time, drain, and if the program calls for it, extract as programmed. In one example, the extraction includes removing water or residual moisture by spinning the machine at medium or high speeds.

Step 7—Clear Rinse.

The machine is then refilled with water to a programmed volume. Again, no ozone is used in this step. Finishing and/or softening chemistry may be added to this step. The machine will tumble for the programmed rinse time, drain, ad if the program calls for it, extract as programmed.

Step 8—Ozone Level Safety Check.

For safety, an ozone gas sensor (72) may be connected to the gas exit.

Figure 19:
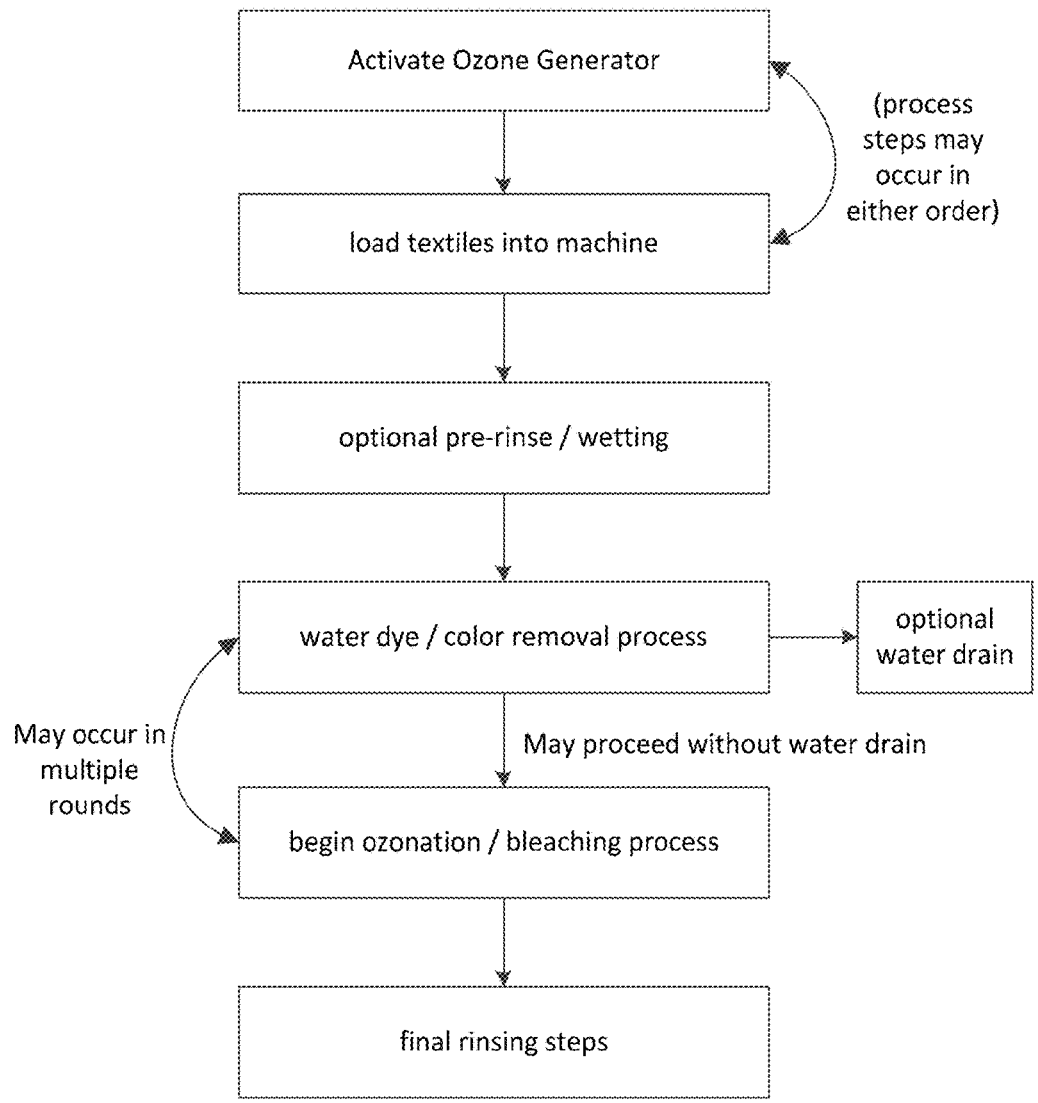
FIG. 19 illustrates a flow chart of a color removal process.
Figure 20:
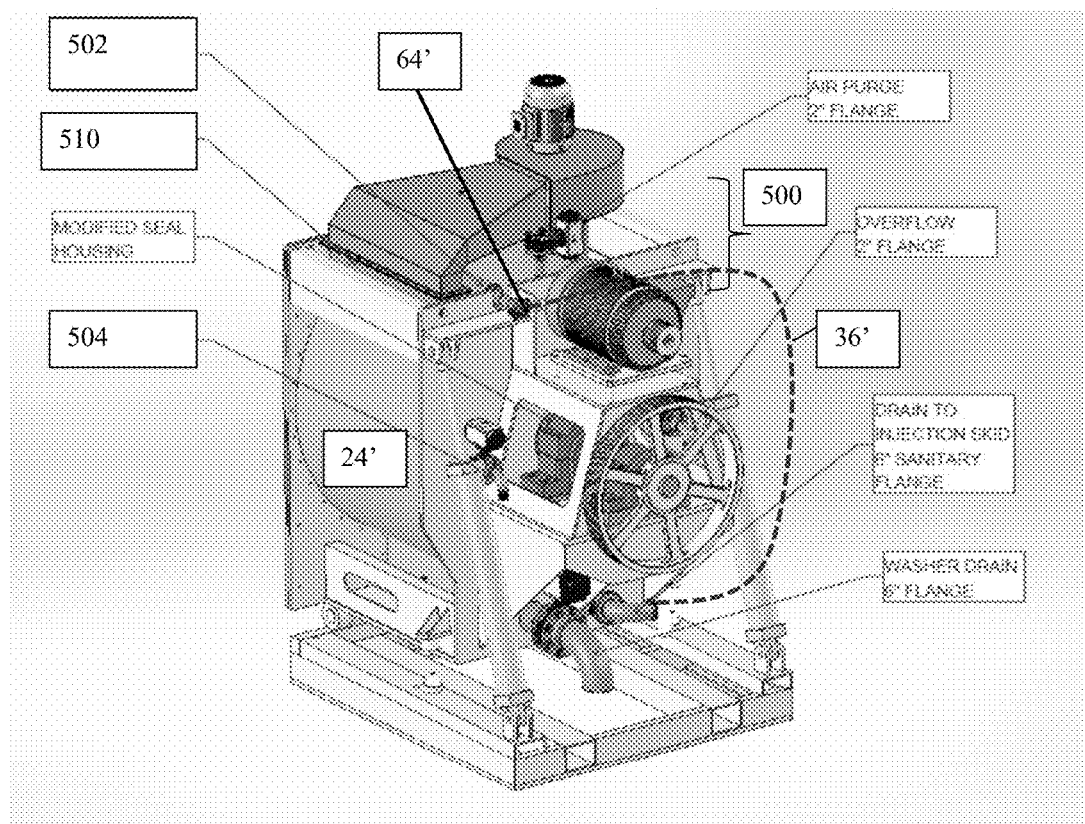
FIG. 20 shows a side perspective view of an alternate hybrid washing machine that may be used in the processes described herein.
Figure 21:
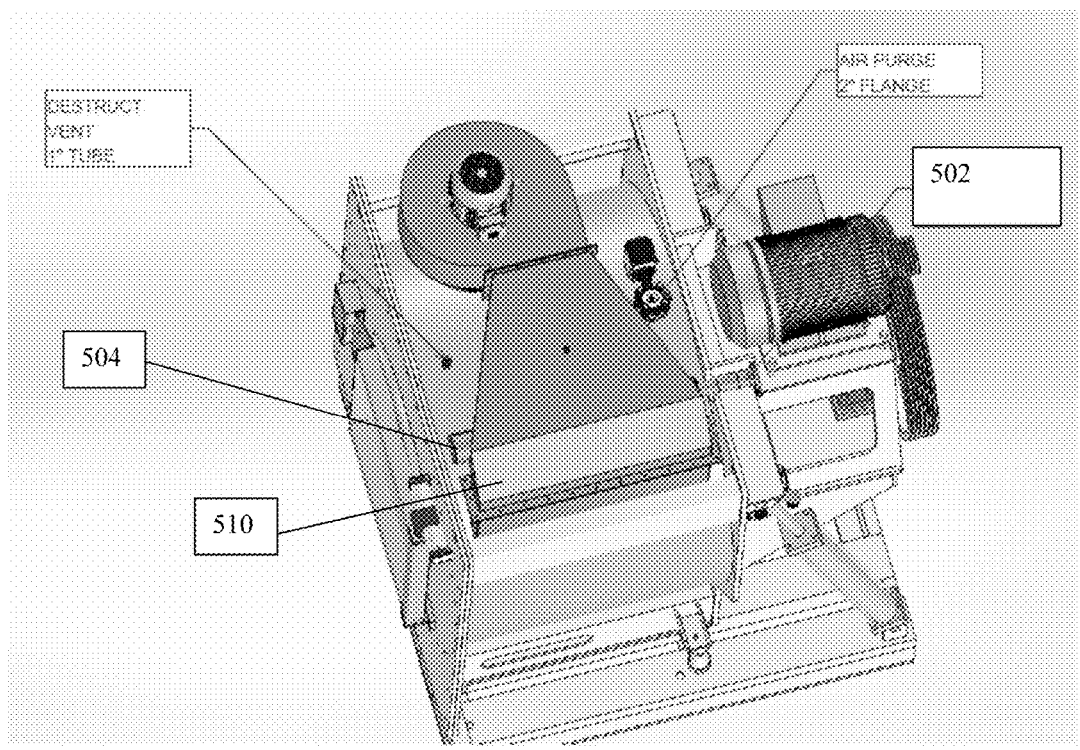
FIG. 21 shows a top perspective view of the alternate hybrid washing machine on FIG. 20.

FIG. 19 provides a flow chart of the color removal process described.

Changes and modifications, additions and deletions may be made to the structures and methods recited above and shown in the drawings without departing from the scope or spirit of the disclosure or the following claims.

What is claimed is:

1. A process for removing dyes or color from processing water in an ozone bleaching system, the ozone bleaching system comprising an ozone generator that communicates with a machine for treating textiles, the process comprising:
   (a) inputting a machine program step based on a selected ozone bleaching factor, the ozone bleaching factor defined as a number of units of ozone to be delivered per time per weight of textiles (units ozone/time/textile weight);
   (b) causing a machine barrel filled with textiles to fill with water;
   (c) activating an ozone color removal process comprising
      (i) sending an ozone dosage request from the machine to the ozone generator based on concentration by weight of the textiles to be treated, by water volume in the machine, or by a combination thereof;
      (ii) determining at which processing step the machine is at and determining an amount of free dye expected to be in the water to be oxidized with ozone;
      (iii) calculating a required ozone dosage for water color removal based on the selected ozone bleaching factor set in step (a); and
      (iv) delivering a selected amount of ozone from the ozone generator to the machine.

2. The process of claim 1, wherein delivering a selected amount of ozone comprises adjusting a proportional flow control valve for sending a determined ozone dosage into the machine.

3. The process of claim 1, wherein delivering a selected amount of the ozone comprises cooperation between a proportional flow control valve and a mass flow meter in order to achieve proper flow rates for precise ozone dosing for water color removal.

4. The process of claim 1, wherein the ozone generator and machine communicate such that once ozone begins dosing into the machine, a timer on the machine is set for a programmed color removal step time.

5. The process of claim 4, wherein the color removal step time is based on the amount of water volume used and the flow rate of the textiles through the machine.

6. The process of claim 4, wherein when the programmed color removal step time has been met, the machine communicates with the ozone generator system to stop the ozone generation volume for the machine.

7. The process of claim 6, wherein a proportional valve stops ozone flow.

8. The process of claim 1, wherein the machine for treating textiles comprises a blower component and further comprising: wherein the blower component is used to dry the machine barrel, allowing operators to quickly switch between wet and dry processes.

9. The process of claim 1, wherein the machine further comprises a spray bar for injecting recirculated ozonated water into an upper portion of the machine barrel.

10. The process of claim 1, wherein the ozone bleaching factor is defined as grams of ozone to be delivered per hour per kilogram of textiles (grams/hr/kg).

11. The process of claim 1, wherein required drain and refill steps are reduced due to the process for removing dyes being conducted before or during an ozone bleaching process.

\* \* \* \* \*